(12) United States Patent
Horiuchi

(10) Patent No.: US 6,304,234 B1
(45) Date of Patent: Oct. 16, 2001

(54) INFORMATION PROCESSING APPARATUS

(75) Inventor: Kazuhito Horiuchi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/028,413

(22) Filed: Feb. 24, 1998

(30) Foreign Application Priority Data

Feb. 26, 1997 (JP) .................................................. 9-042300

(51) Int. Cl.[7] .................................................. G09G 5/00
(52) U.S. Cl. .................................. 345/8; 345/1; 345/7
(58) Field of Search .................. 345/7, 1, 8, 9; 359/630

(56) References Cited

U.S. PATENT DOCUMENTS

| | | | |
|---|---|---|---|
| 5,467,276 | * 11/1995 | Tsuyuki | 364/449 |
| 5,519,410 | * 5/1996 | Smalanskas et al. | 345/7 |
| 5,644,339 | * 7/1997 | Mori et al. | 345/173 |
| 5,689,628 | * 11/1997 | Robertson | 359/118 |
| 5,790,099 | * 8/1998 | Okada | 345/8 |
| 5,790,114 | * 8/1998 | Geaghan et al. | 345/326 |
| 5,905,525 | * 5/1999 | Ishibashi et al. | 345/8 |
| 5,971,538 | * 10/1999 | Heffner | 345/8 |
| 5,977,935 | * 11/1999 | Yasukawa et al. | 345/8 |
| 6,046,712 | * 4/2000 | Beller et al. | 345/8 |

FOREIGN PATENT DOCUMENTS 7-028884    1/1995   (JP) .

* cited by examiner

Primary Examiner—Richard Hjerpe
Assistant Examiner—Kimnhung Nguyen
(74) Attorney, Agent, or Firm—Frishauf, Holtz, Goodman, Langer & Chick, P.C.

(57) ABSTRACT

An information processing apparatus is provided which includes an information/data memory for storing information/data in association with predetermined titles, an external display for displaying a screen for selecting a title, an information/data retrieval device for accepting the selection of a title and retrieving information/data associated with the selected title from the information/data memory, and an information/data display for displaying the information/data on an ocular basis.

14 Claims, 18 Drawing Sheets

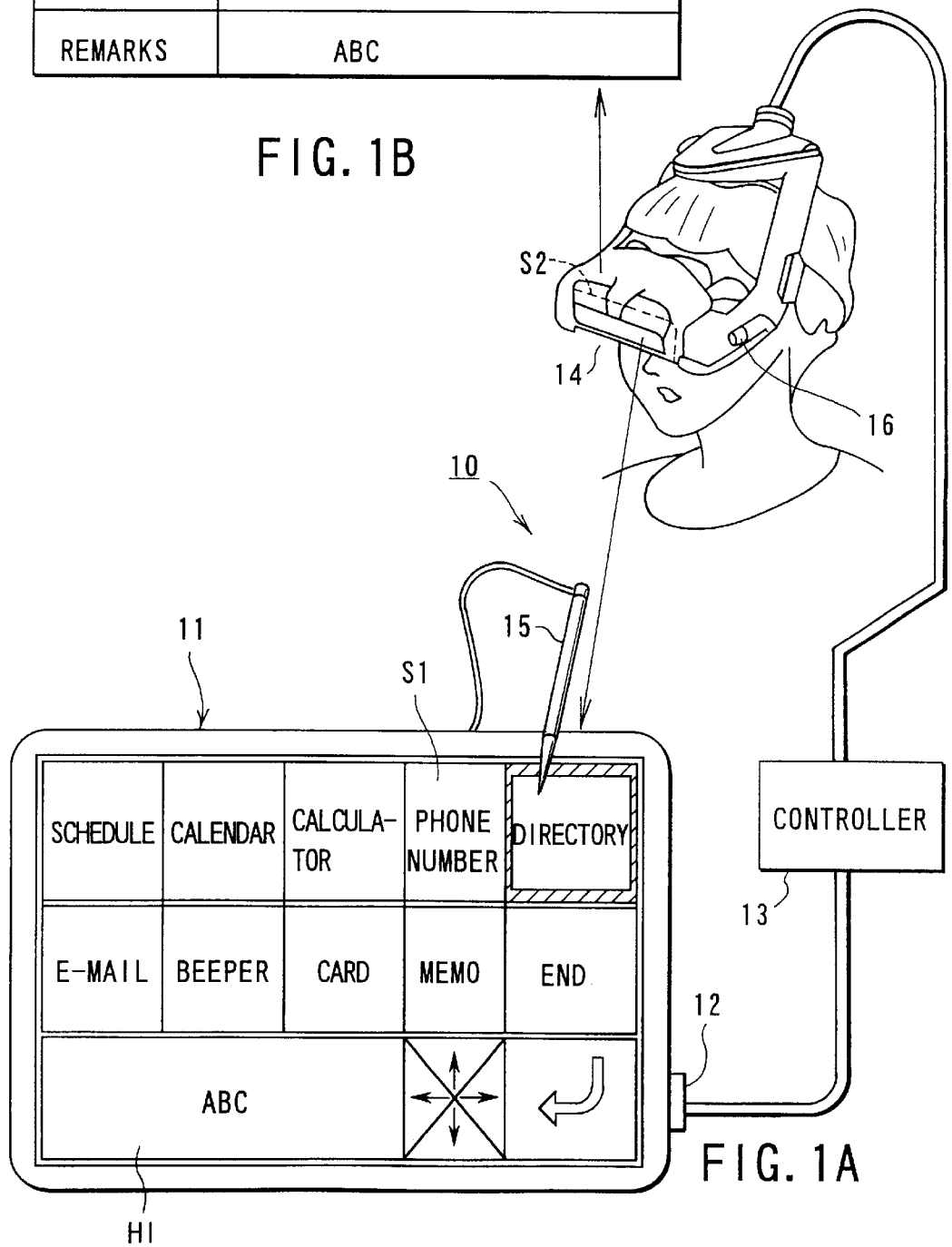

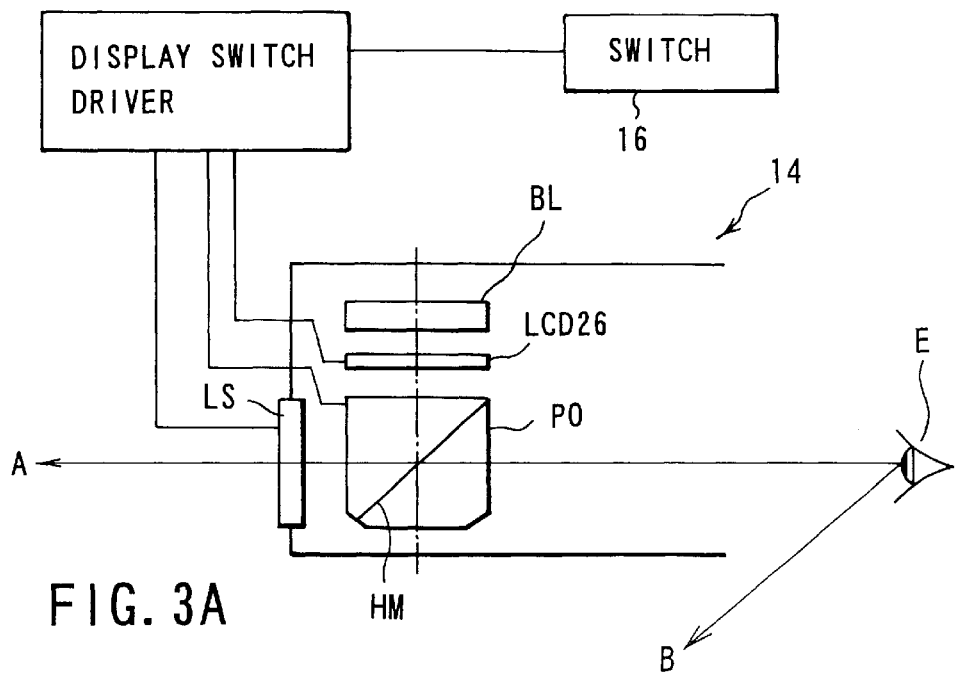
FIG. 3A
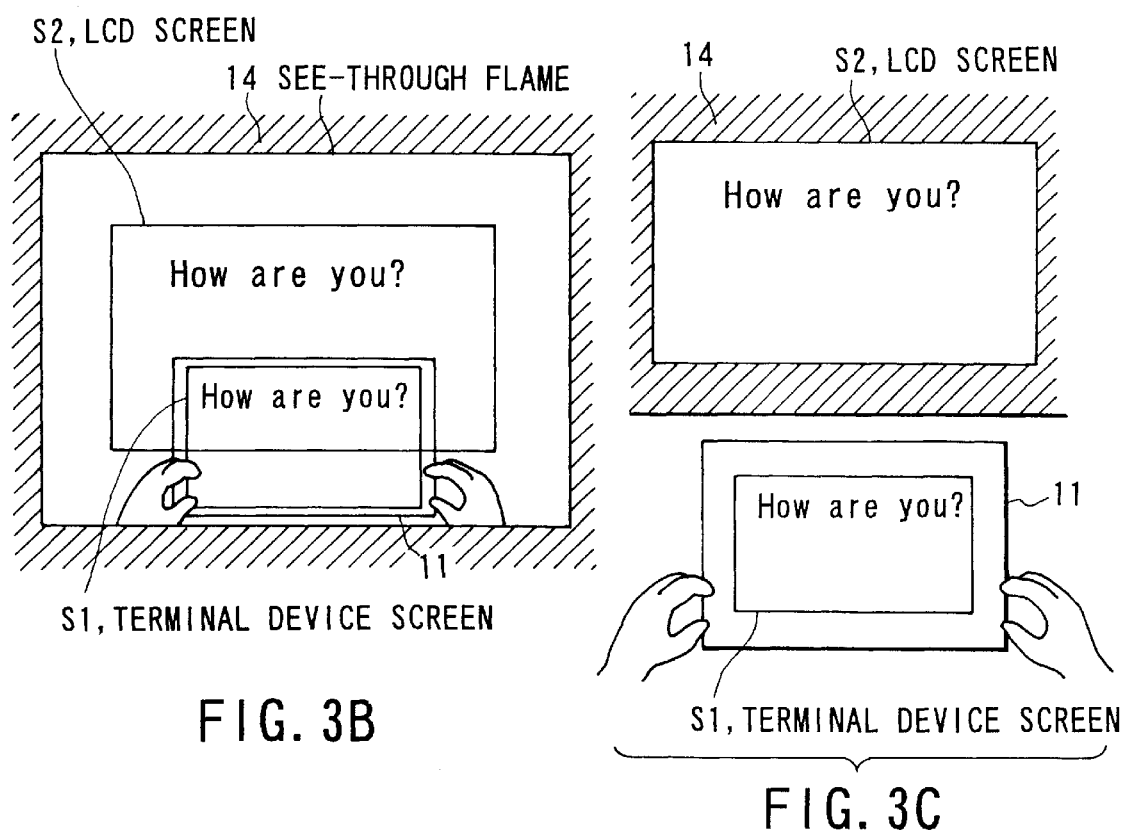
FIG. 3B
FIG. 3C

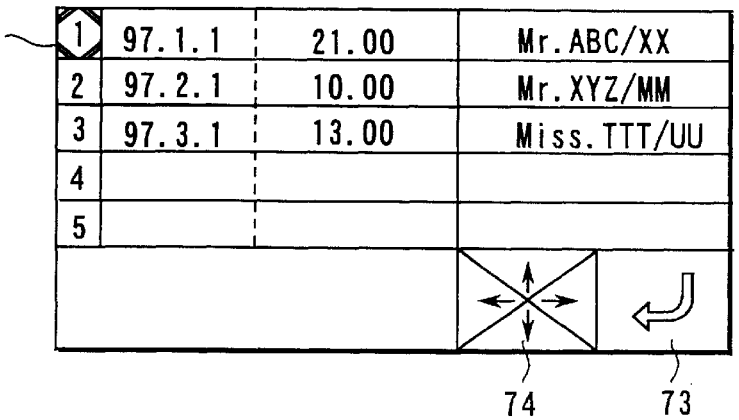
FIG. 15A
FIG. 15B
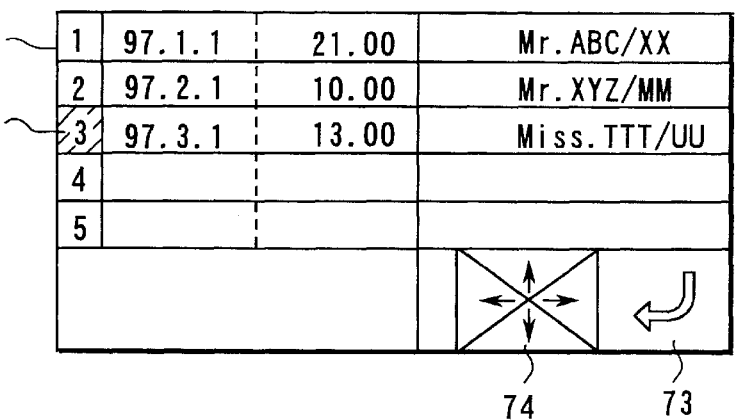
FIG. 16A
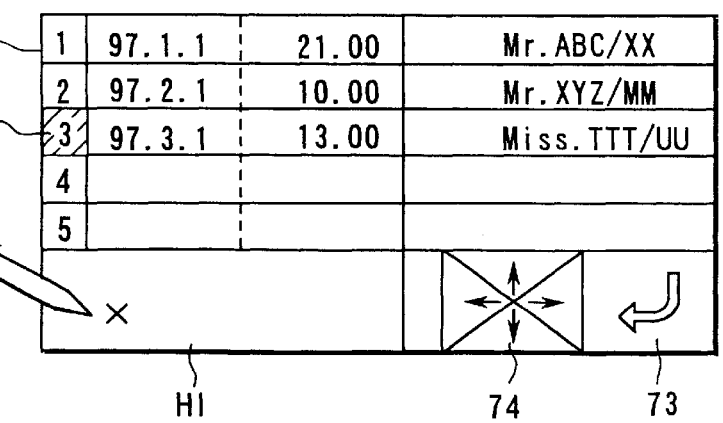
FIG. 16B

INFORMATION PROCESSING APPARATUS

BACKGROUND OF THE INVENTION

The present invention relates to an information processing apparatus including a portable terminal device and the like and, more particularly, to an information processing apparatus in which problems associated with screen display functions of a portable terminal device are solved to display more information and to improve usability of the same.

Recently, portable information terminal devices for personal use such as PDAs have begun to widely spread. The portable terminal devices include a display screen which serves as both an input device and a display device, provided in its body substantially in the size of a palm. Such portable terminal devices have a problem in that the area of their display screens is very small because of their portability. For this reason, a configuration is employed which magnifies each piece of information to display it across the entire screen, thereby allowing the user to see it with increased ease.

Specifically, when such a portable information terminal device is activated, the display screen first displays a main menu which allows selection of various functions of the device. When the user selects any function from the main menu, the function is started and the contents thereof are magnified and displayed across the entire display screen.

For example, let us assume that an icon "mail" is selected from the main menu. Then, a list of mail which has been received is displayed across the entire display screen. When the mail to be read is selected from the mail list, the contents of the mail will then be displayed across the entire display screen.

Meanwhile, to select another function from this state, the detailed information currently opened is temporarily closed and the required function is then selected. This results in a magnified display of the detailed information of the function across the entire display screen.

Thus, a conventional portable terminal device must be selected to display either menu of functions or detailed information across the entire screen because the display area of the screen is small. This results in a problem in that the selection of a desire function menu to obtain desired detailed information involves much time and labor, making the operation complicated.

BRIEF SUMMARY OF THE INVENTION

It is therefore a particular object of the invention to provide an information processing apparatus in which the problem associated with the screen display function of the portable terminal device is solved to allow more information to be displayed and to improve usability.

The present invention has been conceived to solve the above described problem associated with conventional information processing apparatuses and, according to a first aspect of the invention, there is provided an information processing apparatus comprising:

an information/data memory for storing information/data in association with predetermined titles;

an external display for displaying a screen for selecting a title;

an information/data retrieval device for accepting the selection of a title and retrieving information/data associated with the selected title from the information/data memory; and an information/data display for displaying the information/data on an ocular basis.

The information/data display preferably includes an ocular optical system for guiding the retrieved information/data to the eyeballs of an observer with a substantial magnification from at least the display area of the external display. In this case, the ocular optical system preferably includes an external observation optical system for allowing observation of a screen for title selection displayed on the external display separately from the information/data. Further, the ocular optical system may include an image switching optical system for selectively displaying either or both of the screen for title selection and information/data.

With such a configuration, it is possible to continue displaying the title selection screen even when a detailed screen of the information/data is displayed and to view both of them simultaneously. This allows selection of information/data to be switched to another quickly.

With the distance of distinct vision of the information/data display set in accordance with the distance to the external display, the image for title selection on the external display and information/data on the information/data display can be easily recognized simultaneously.

It is also possible to observe the external near the observer without the intervention of the external observation optical system.

The most preferably mode of this information/data display is a head-mounted information/data display which can be used by mounting on a user's head. Such a configuration facilitates the selection of a title and the like to improve operability because required information/data are always displayed in front and it leaves both hands unoccupied.

According to a second aspect of the invention, the information/data memory, external display and information/data retrieval device according to the first aspect are integrally contained in a case which can be carried by hand.

Such a configuration makes it possible to view a title display screen displayed on the external display along with information/data displayed on the information/data display. It also makes it possible to reduce the weight of the information/data display to eliminate any problem which may otherwise arise when the information/data display is of the head-mounted type.

According to a third aspect of the invention, the external display of the information processing apparatus according to the first aspect displays a title as described above in an appropriate form which allows easy recognition. Specifically, the title may be displayed with an icon which represents the contents of the information/data. Alternatively, there may be provided an image data contraction/display device for providing a contracted display of each piece of information/data associated with a title as described above. Further, there may be provided a title display modification device for displaying a title for information/data displayed on the information/data display such that it can be distinguished from another title on the title selection screen.

Such a configuration facilitates understanding of the contents of a title and hence selection of the same. Further, the distinct display of a currently selected title allows a user to recognize to which title information/data currently viewed corresponds, which is convenient in that it eliminates any error in selecting another title.

According to a fourth aspect of the invention, the information processing apparatus according to the first aspect further comprises:

a handwriting character input device provided in the external display;

a handwritten-character display device for display the handwritten characters input from the handwriting character input device on the external display, after the information/data retrieval device retrieved information/data associated with the selected title from the information/data memory;

a character code conversion device for converting handwritten characters input from the handwriting character input device into character codes; and a character display device for displaying the character codes as a result of the conversion at the character code conversion device on the information/data display.

Such a configuration makes it possible to use the external display device as a handwriting input device and to display the input characters on the information/data display. As a result, an input sentence can be entirely observed even when the input device is small.

According to a fifth aspect of the invention, the information/data memory of information processing apparatus according to the first aspect is a replaceable memory.

Such a configuration allows the information processing apparatus to be used for various applications such as PDAs and car navigation systems. It also facilitates the exchange of information with other information processing apparatuses.

According to a sixth aspect of the invention, the information processing apparatus according to the first aspect further comprises an information/data writing means for writing plural types of information/data which have been created or modified by a user into the information/data memory.

Such a configuration accommodates information/data exclusive for personal use. Further, the creation of information/data exclusive for personal use makes it possible to provide the information processing apparatus with flexibility to allow each user utilize the same with increased ease.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1A is a diagram showing a schematic configuration of an information processing apparatus according to a first embodiment of the present invention;

FIG. 1B is a diagram showing an example of an image displayed on an HMD;

FIG. 3A is a schematic configuration diagram showing an optical system included in the HMD;

FIG. 3B is a diagram illustrating a see-through function;

FIG. 3C is a diagram illustrating a see-around function.

FIGS. 15A and 15B are diagrams showing a use and the like of an information processing apparatus according to the seventh embodiment of the present invention;

FIGS. 16A and 16B are diagrams showing a use and the like of an information processing apparatus according to the seventh embodiment of the present invention;

DETAILED DESCRIPTION OF THE INVENTION

Figure 2A:
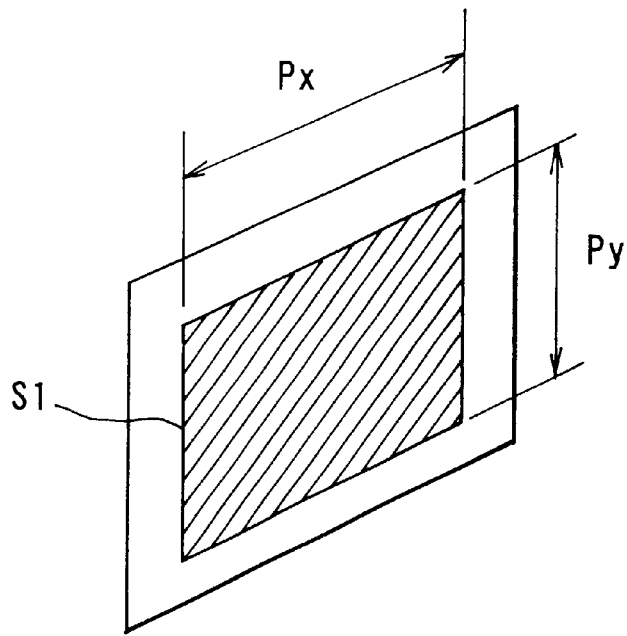
FIGS. 2A and 2B are diagrams illustrating an operation of an ocular optical system.

Embodiments of the present invention will now be described with reference to the drawings. First through seventh embodiments of the invention will be first with reference to FIGS. 1 through 16B, and specific apparatus configurations for implementing the embodiments will then be described with reference to FIG. 17 and the figures following it.

(First Embodiment)

A first embodiment of the present invention will be first described with reference to FIG. 1A through FIG. 5B.

FIG. 1A is a schematic configuration diagram showing an information processing apparatus 10 according to the present embodiment. The information processing apparatus 10 includes a portable terminal device 11 having a handwriting input function and a head-mounted display (HMD) 14 connected to the portable terminal device.

The portable terminal device 11 has a display screen S1 and a handwriting character input portion HI on one side of the case thereof. A menu listing various functions as shown in FIG. 1A is displayed as an initial screen on the display screen S1. The function menu may be displayed in the form shown in FIG. 1A in which the characters of titles are shown and, alternatively, the contents of the functions may be iconized using graphics and the like. Alternatively, the display may include both characters and icons.

Further, the portable terminal device 11 is accompanied by and connected to a pen type pointing device 15. With the pointing device 15, a function to be opened can be selected from the function menu by touching the display screen Sl, and required information can be input to the handwriting character input portion HI on a handwriting basis.

An image output terminal 12 is provided on the portable terminal device 11, and at least a part of the image displayed on the display screen S1 or the information input to the handwriting input portion HI can be output from the image output terminal 12 through a controller 13 indicated by 13 in FIG. 1A to the head-mounted display (HMD) 14.

The HMD 14 incorporates an ocular optical system for guiding the image data it has received to the eyeballs of an observer with a substantial magnification from the display area of the display screen S1 of the portable terminal device 11. The ocular optical system will now be described with reference to FIGS. 2A through 3C.

Figure 2B:
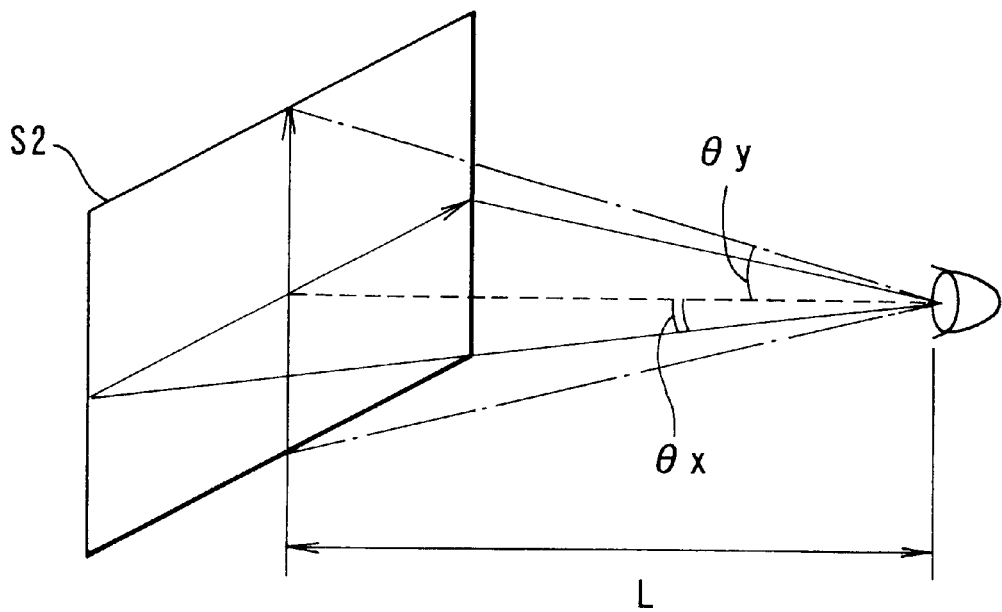

FIG. 2A is a schematic diagram showing the display screen S1 of the portable terminal device 11, and FIG. 2B is a schematic diagram showing an actual display screen S2 on the HMD 14. In those figures, Px represents the length of the display screen S1 of the portable terminal device 11 in the horizontal direction thereof; Py represents the length of the same in the vertical direction thereof; θx represents a half angle of view of the HMD 14 in the horizontal direction thereof; and θy represents a half angle of view of the same in the vertical direction thereof. Then, the relationship between the display areas of the portable terminal device 11 and the HMD 14 can be expressed by:

$$4L^2 \cdot \tan\theta x \cdot \tan\theta y > Px \cdot Py \qquad \text{(Equation 1)}$$

where L represents the distance of distinct vision of the HMD 14 and where L=500 mm. A specific example will be shown below.

Let us assume that the horizontal length Px and vertical length Py of the display screen S1 of the portable terminal device 11 are 88 mm and 62 mm, respectively. Then, the display area of the display screen S1 is 5456 mm$^2$ (approximately 4.24"). When this is observed through the HMD 14, the actual display area of the HMD 14 will be approximately 100,000 mm$^2$ (approximately 17.9") which satisfies Equation 1 where the horizontal half angle of view θx of the HMD 14 is 20° and the aspect ratio of the display screen S2 is 4/3 (=tan θx/tan θy).

The HMD 14 has at least one of functions for observing the external such as a so-called see-through function (function of allowing a user to see the external through it), a see-around function (a function of allowing a user to directly see the external with the HMD mounted in place) and a monocular display function.

As shown in FIG. 3A, the HMD 14 includes a liquid crystal shutter LS, a prism optical system PO having a half mirror HM, a liquid crystal display portion LCD, a back light BL, etc. The HMD 14 allows an image displayed on the LCD 26 and an external view to be observed simultaneously.

FIG. 3B shows how an image on the HMD 14 is observed with an external view of an image on the terminal device 11 overlapping therewith. The eyes E of the observer are looking in the direction indicated by the arrow A in FIG. 3A, and the liquid crystal shutter LS is OFF (a state wherein the external is visible). The state which allows the display screen S2 of the HMD 14 and the display screen S1 of the terminal device 11 to be observed in an overlapping relationship as shown in FIG. 3B is hereinafter referred to as "superimpose".

FIG. 3C shows how an external view near the observer is observed with the image kept displayed on the display screen S2 of the HMD 14. At this time, the eyes of the observer are also looking in the direction indicated by the arrow B in FIG. 3A, i.e., they are simultaneously looking at a region near the operator. The state in which the display screen S2 of the HMD 14 and the display screen S1 of the terminal device 11 can be observed in the same range of a viewing angle as shown in FIG. 3C is referred to as "see-around".

A use or the like of the information apparatus 10 of the first embodiment will now be described with reference to FIGS. 4, 5A and 5B.

Referring first to FIG. 1A, for example, "directory" on the menu of functions to be opened is touched by the tip of the pointing device 15 with the menu of functions including "directory" and "schedule" displayed on the display screen SI. In response, the portable terminal device 11 retrieves, for example, the screen information shown in FIG. 1B as detailed information on the directory and transmits it to the HMD 14 through the controller 13.

Thus, the detailed information shown in FIG. 1B can be projected on the display screen S2 of the HMD 14 with the menu of functions kept displayed as it is on the display screen S1 of the portable terminal device 11.

As described above, the HMD 14 has external observation functions such as the see-through, superimpose and see-around functions. Therefore, the user is able to look at the menu of functions on the display screen S1 of the portable terminal device 11 while looking at the detailed information shown in FIG. 1B on the display screen S2 of the HMD 14.

Specifically, in a state in which the display screen S2 of the HMD 14 displays the detailed information or in a state in which the screen displays nothing and the external is invisible, a see-through/superimpose select switch 16 shown in FIG. 1A is switched to a see-through position. This gives a view of the external. By switching the select switch 16 to a superimpose position, the detailed information on the display screen S2 of the HMD 14 can be seen in an overlapping relationship with the menu of functions displayed on the display screen S1 of the portable terminal device 11.

Figure 4:
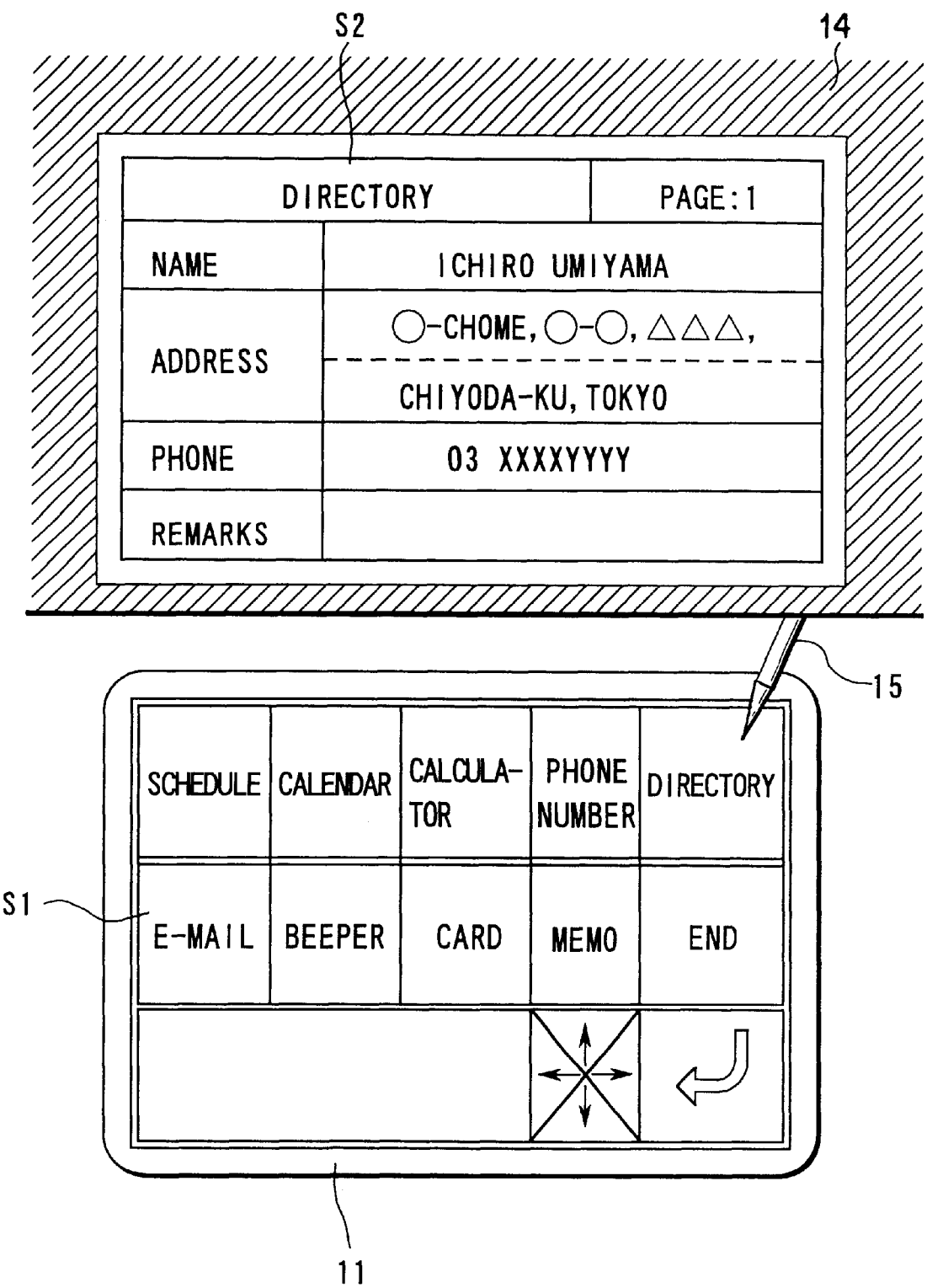
FIG. 4 is an illustration showing a use and the like of the information processing apparatus according to the first embodiment.

FIG. 4 shows a state which is achieved when the HMD 14 has the so-called see-around function. As shown in FIG. 4, in this state, the observer sees the display screen S2 of the HMD 14 directly in front of him or her and sees the display screen S1 of the portable terminal device 11 in a position where the region at his or her reach is visible. Thus, the observer can look at the menu of functions displayed on the display screen S1 of the portable terminal device 11 by simply turning his or her line-of-sight regardless of the state of the display screen S2 of the HMD 14. This makes it possible to look at the menu of functions and the detailed information on the display screen S2 of the HMD 14 in reference to each other. The see-through/superimpose select switch 16 may be provided on an outer surface of the HmD 14 as shown in FIG. 1A or anywhere on the portable terminal device 11.

Therefore, another function can be selected by simply performing a selection operation on the menu of functions displayed on the display screen S1 of the portable terminal device 11, and the operation is thus quite simple.

When information is input to the handwriting input portion HI of the portable terminal device 11, the information can be observed on both of the terminal device 11 and HMD 14. For example, let us assume that characters "ABC" are input by handwriting to the handwriting input portion HI of the portable terminal device 11 as shown in FIG. 1A. Then, the characters "ABC" input by handwriting are converted into character-codes and then also displayed, for example, on the remarks column of the display screen S2 of the HMD 14 along with the detailed information, as shown in FIG. 1B.

Figure 5A:
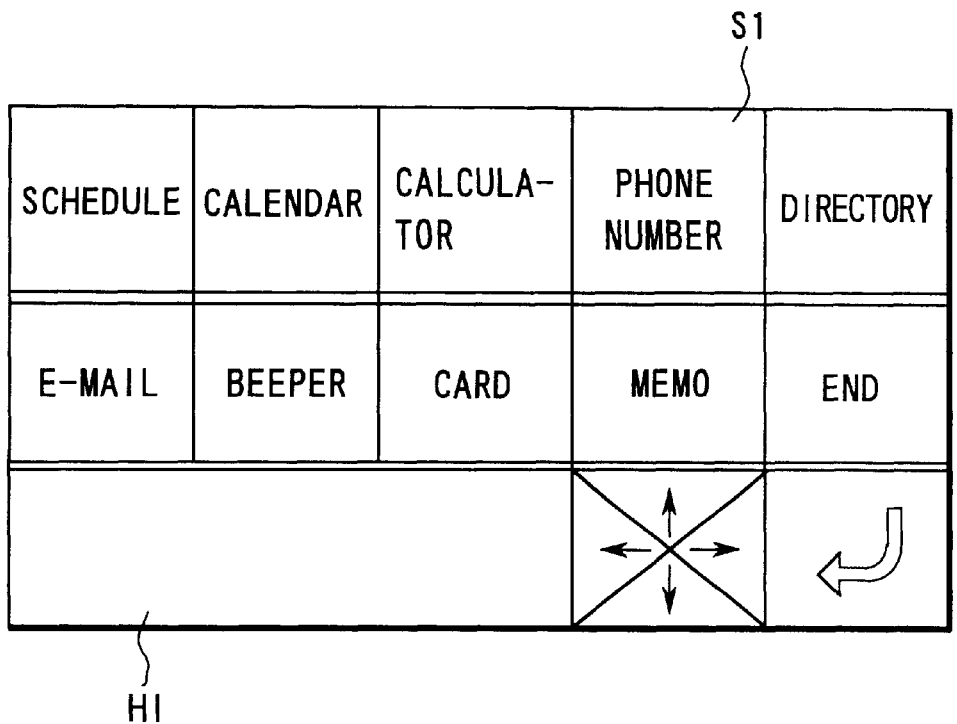
FIGS. 5A and 5B are illustrations showing an example of a handwriting input function of the information processing apparatus according to the first embodiment.
Figure 5B:
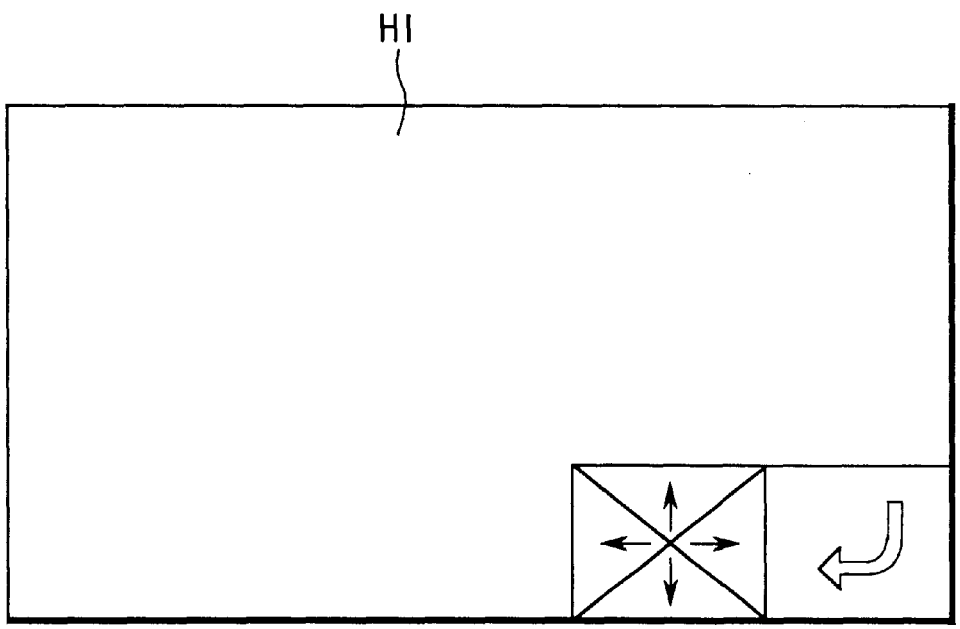

The portable terminal device 11 may be adapted such that it can be converted, at the handwriting input operation as described above, from the a state wherein the menu of functions is displayed on the display screen S1 of the portable terminal device 11 as shown in FIG. 5A into a state wherein the display screen S1 of the portable terminal device 11 as a whole serves as the handwriting input portion HI as shown in FIG. 5B. Such conversion increases the range for input of detailed information by handwriting to make the input operation easier.

(Second Embodiment)

Figure 6:
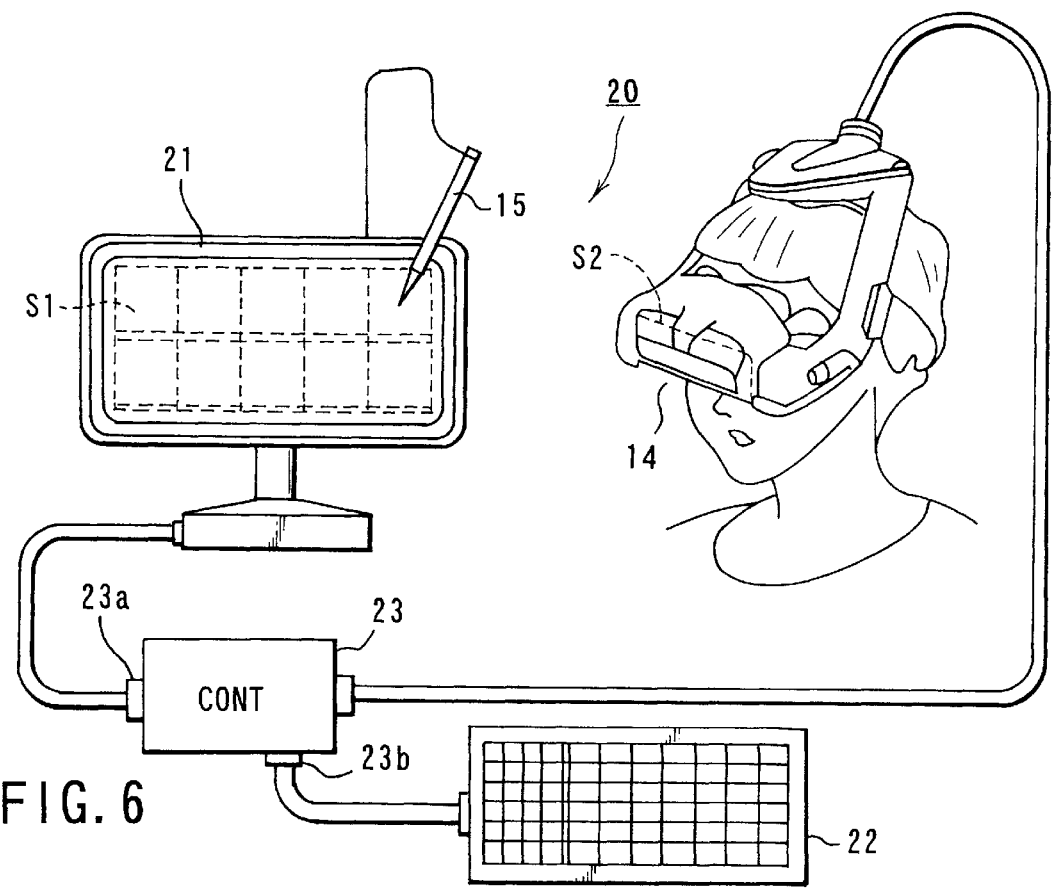
FIG. 6 is a diagram showing a schematic configuration of an information processing apparatus according to a second embodiment of the present invention.

FIG. 6 is a diagram showing a configuration of an information processing apparatus 20 according to the second embodiment of the invention. Elements similar to those in the first embodiments are indicated by same reference numbers and will not be described here.

As shown in FIG. 6, the information processing apparatus 20 includes a device which is a combination of a compact monitor 21, a keyboard 22 and a controller 23 incorporating a memory in place of the portable terminal device 11 having a handwriting input function according to the first embodiment.

In addition to an output terminal to an HMD 14, the controller 23 with a memory includes an information input terminal 23a for outputting image information stored in the memory to the compact monitor 21 and for inputting position information on a location pointed by a pointing device 15 to the controller 23 with a memory and a device input terminal 23b for receiving device inputs from the keyboard 22. A pen type pointing device 15 is attached to the compact monitor 21 like the first embodiment.

Like the apparatus of the first embodiment, with the apparatus according to the present embodiment, when a function on a menu on a display screen S1 of the compact monitor 21 is touched with the tip of the pointing device 15, detailed information of the function is displayed on a display screen S2 of the HMD 14. Therefore, the detailed information can be observed with the menu of functions kept unhidden. Further, since information can be input using the keyboard 22, the compact monitor 21 can continue to display only the menu of functions. This further facilitates the selection from the menu of functions.

The selection from the menu of functions may be performed using a touch panel instead of the pen type pointing device 15. Referring to the inputting of information, instead of the keyboard 22, an OCR may be used to input information written on paper by optically reading it.

(Third Embodiment)

Figure 7:
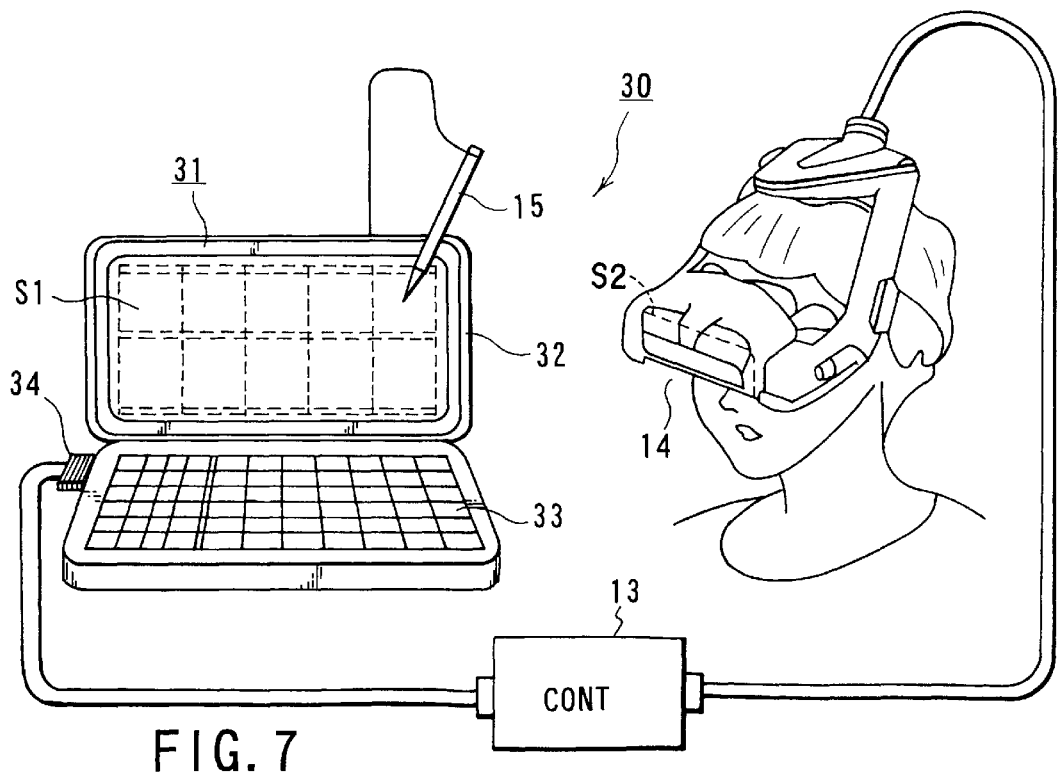
FIG. 7 is a diagram showing a schematic configuration of an information processing apparatus according to a third embodiment of the present invention.

FIG. 7 is a diagram showing a configuration of an information processing apparatus 30 according to the third embodiment of the invention. Elements similar to those in the first embodiments are indicated by like reference numbers and will not be described here.

As shown in FIG. 7, the information processing apparatus 30 of the present embodiment is comprised of a notebook type personal computer (hereinafter referred to as "personal computer) 31 instead of the portable terminal device 11 having a handwriting input function according to the first embodiment. The personal computer 31 is comprised of a display portion 32 and a keyboard 33 and includes an image output terminal 34. A pen type pointing device 15 is provided like the first embodiment.

When a function on a menu displayed on a display screen S1 of the personal computer 31 is selected by touching with the tip of the pen type pointing device 15, detailed information of the selected function is displayed on a display screen S2 of an HMD 14. Therefore, like the first and second embodiments, the detailed information can be observed and edited with the menu of functions kept unhidden. In the present embodiment, an input operation can be performed on the keyboard 33 of the personal computer 31, the operation and, therefore, the operation feels similarly to an operation on a normal OA apparatus.

Pointing devices such as a mouse, track ball and track pad may be used instead of the pen type pointing device 15. Further, a touch panel type menu selecting function may be used.

(Fourth Embodiment)

Since the present embodiment relates to the function of the terminal device of each of the first to third embodiments and, therefore, the overall configuration of the apparatus will not be shown.

The apparatus of this embodiment includes an application for displaying files of documents, figures, equations, photographs created by different software together.

Figure 8A:
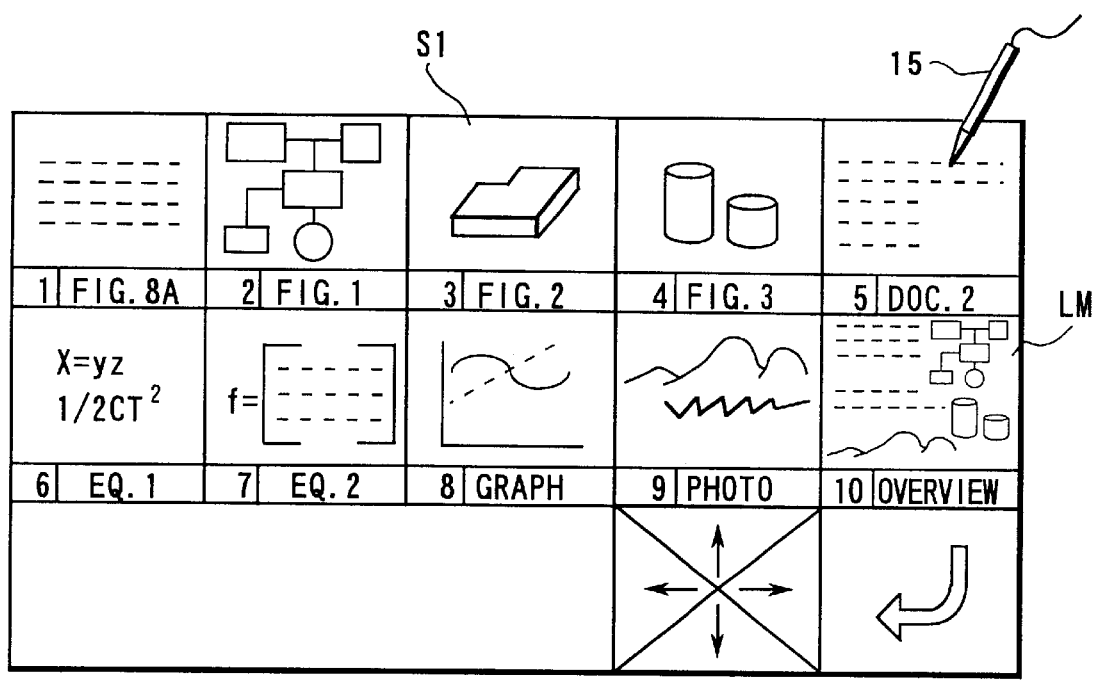
FIGS. 8A and 8B are diagrams showing a use and the like of an information processing apparatus according to a fourth embodiment of the present invention.

As shown in FIG. 8A, various menu screens are displayed on a display screen S1 of a portable terminal device 11. In this example, files created by different software such as document files created by word processing software, figures created by drawing software and graphs created by spreadsheet software are displayed as menu screens with their contents reduced.

Figure 8B:
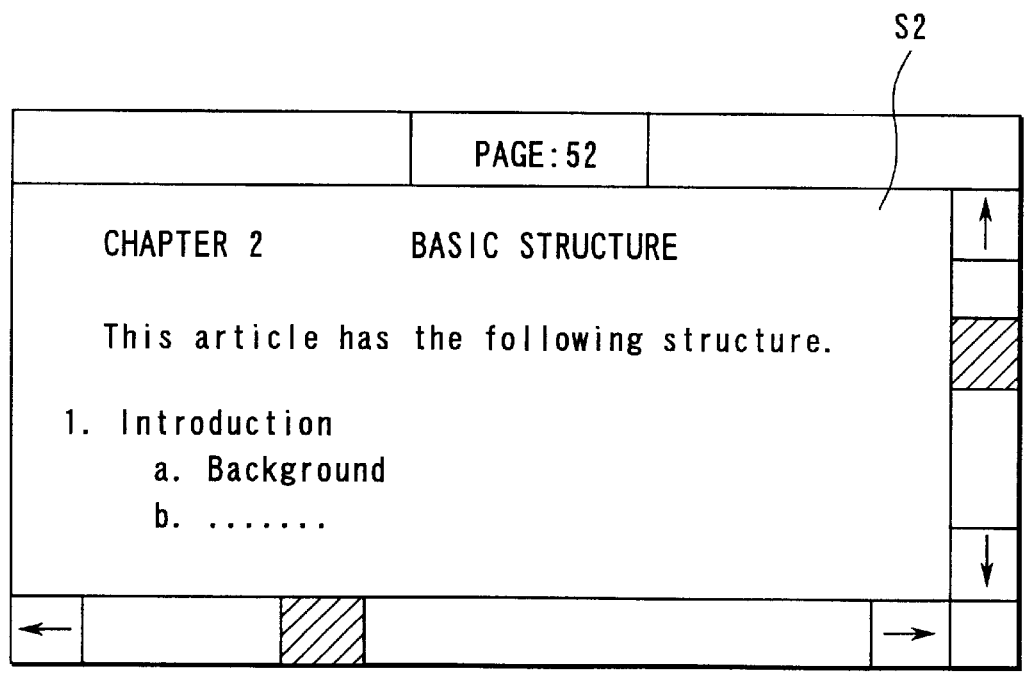

When a document to be edited, e.g., a document file "document 2" is selected, the application for the "document 2" is activated, and the selected "document 2" is opened across the entire display screen S2 of the HMD 14 as shown in FIG. 8B. The control of on-screen input is transferred from the display screen S1 of the portable terminal device 11 to a display screen S2 of the HMD 14. Thus, operations such as the input of information and pointing are now performed on the display screen S2 as shown in FIG. 8B. When editing is completed and the document is closed, the input control is transferred back to the display screen S1 of the portable terminal device 11.

As described above, when data for an article or the like which indispensably involves figures, tables and equations is created, a file to be edited can be quickly found because figures, sentences and graphs are displayed in order on the display screen S1 of the portable terminal device 11. Further, since they are displayed with reduced contents, it is possible to know the contents carried by each file at a glance. Further, when an article or data is created from files created by different software, it can be laid out with increased clarity. Referring especially to layout, since display of overall layout LM is added as one of the items of the menu as shown at the right end of FIG. 8A, an article or data can be created as the creator images.

(Fifth Embodiment)

Figure 9:
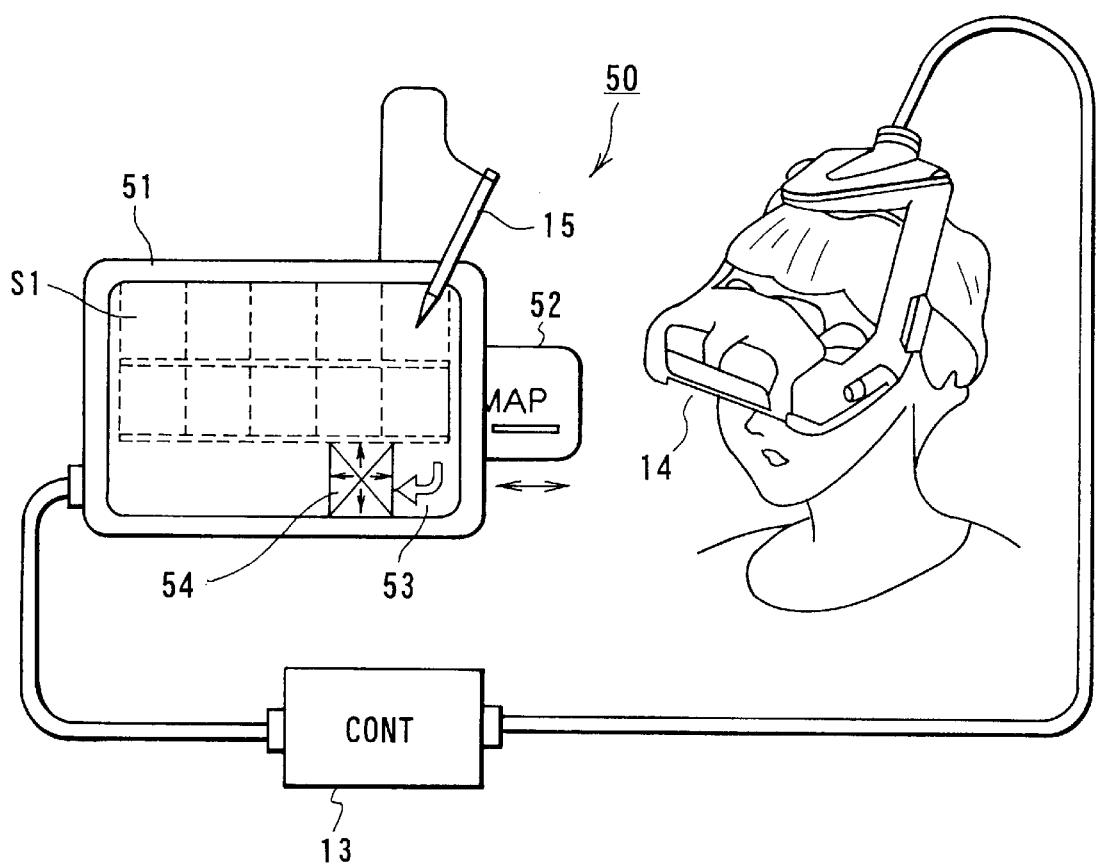
FIG. 9 is a diagram showing a schematic configuration of an information processing apparatus according to a fifth embodiment of the present invention.

FIG. 9 is a diagram showing a configuration of an information processing apparatus 50 according to a fifth embodiment of the invention. Where the configuration of the present embodiment is identical to that of the first embodiment, like reference numbers will be used and description will be omitted.

The apparatus of the present embodiment includes an application for a road map used for car navigation and the like. The following description will refer, as an example, to a case wherein a person in the assistant driver's seat who has no particular need for a car navigation system guides the driver.

Figure 10A:
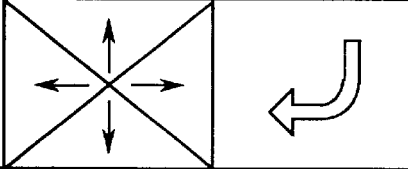
FIGS. 10A and 10B are diagrams showing a use and the like of an information processing apparatus according to the fifth embodiment of the present invention.
Figure 10B:
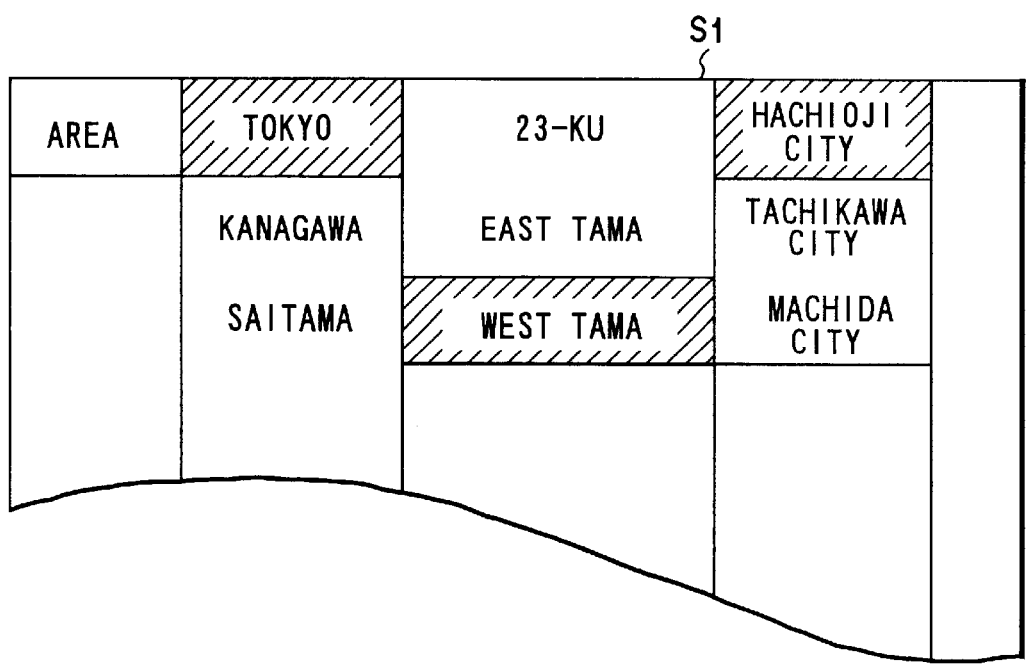
Figure 11A:
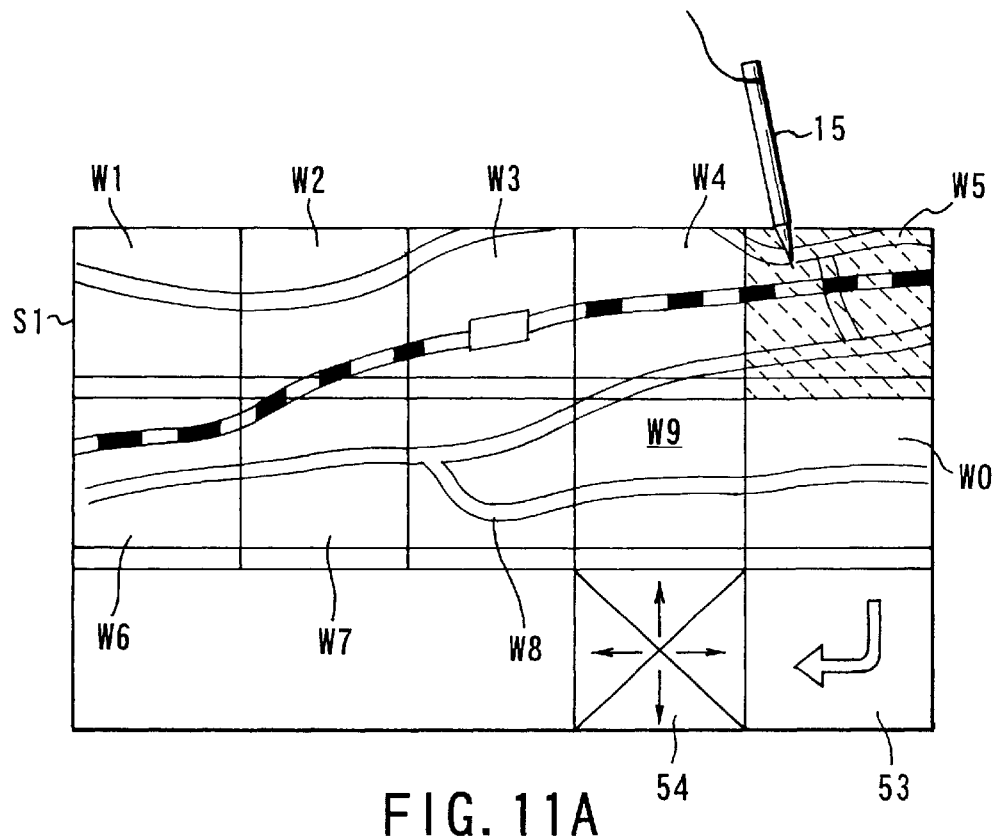
FIGS. 11A and 11B are diagrams showing a use and the like of an information processing apparatus according to the fifth embodiment of the present invention.

As shown in FIG. 9, an IC card 52 carrying information on a road map can be set in a portable terminal device 51. When the IC card 52 is set in the portable terminal device 51 and activated, an initial screen as shown in FIG. 10A appears on a display screen S1. Then, the user specifies the area to be displayed and the degree of the scale to be used on the display screen S1. It is possible to specify a landmark, starting point, destination and the like to obtain a display of map information representing the range. defined by them. The input may be performed by handwriting or may be performed by selecting required items among items displayed on the display screen S1 as shown in FIG. 10B to select them. When an input fixing key 53 is operated upon the completion of input, the specified map information is displayed on the display screen S1 of the portable terminal device 51 as shown in FIG. 11A. In this case, the optimum one is displayed from among pieces of map information in the IC card 52 to show the specified area in the specified scale such that satisfactory information between the specified starting point and destination is provided. By using a cursor moving key 54 as a key to scroll the screen, the entire display screen S1 of the portable terminal device 51 can be scrolled.

Figure 11B:
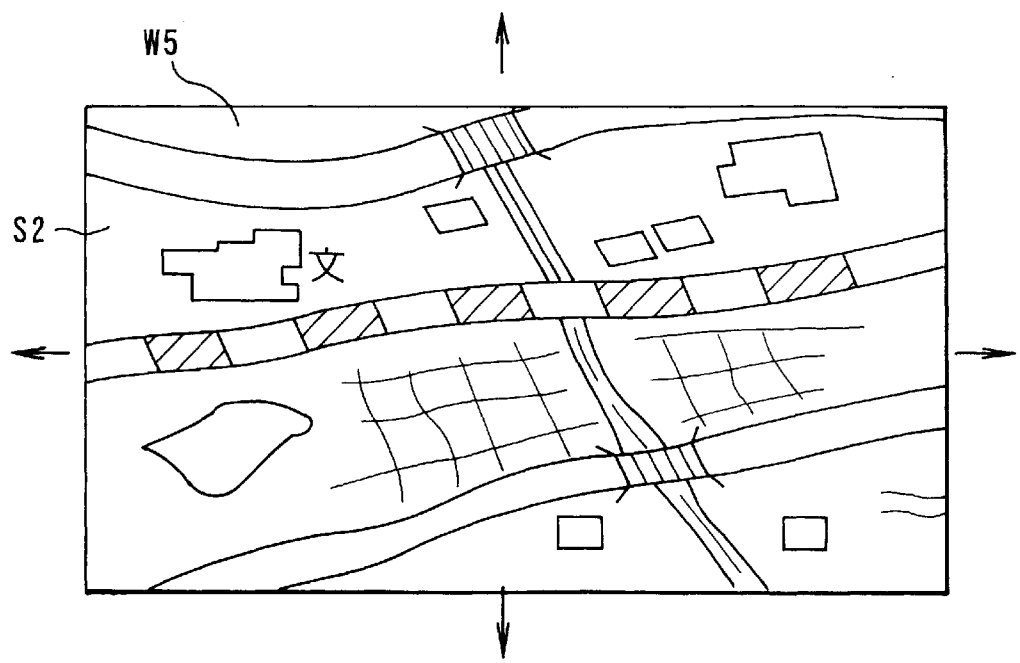

When it is desired to look at a detailed map for any one of ten sections W1 through W0 shown in FIG. 11A, e.g., the section W5, the section W5 is clicked with a pointing device 15. Then, a magnified display of map information for that part appears on a display screen of an HMD 14 as shown in FIG. 11B. At this time, the map for the entire area is left on the display screen S1 of the portable terminal device 51 and the selected display portion displayed on the HMD 14 corresponding to the section W5 is a display state different from that for the other sections. When the screen scroll key 54 of the portable terminal device 51 is operated in this state, the magnified map on the display screen S2 of the HMD 14 is scrolled in vertical and horizontal directions as indicated by the arrows.

Note that, when displaying the map information on the display screen S2 of the HMD 14, the selected section may also be displayed with substantially magnified and three-dimensional state.

Another click on the section W5 selected and displayed causes the magnified map on the HMD 14 to disappear, and the control function is transferred to the portable terminal device 51.

This eliminates a time-consuming step as encountered, for example, in checking a normal map wherein a mark is put in the vicinity of the destination on a page showing a large area and the page showing a detailed map of the destination is looked for again and makes it possible to look for the destination by observing a detailed map with a map for the global area displayed simultaneously.

(Sixth Embodiment)

Figure 12:
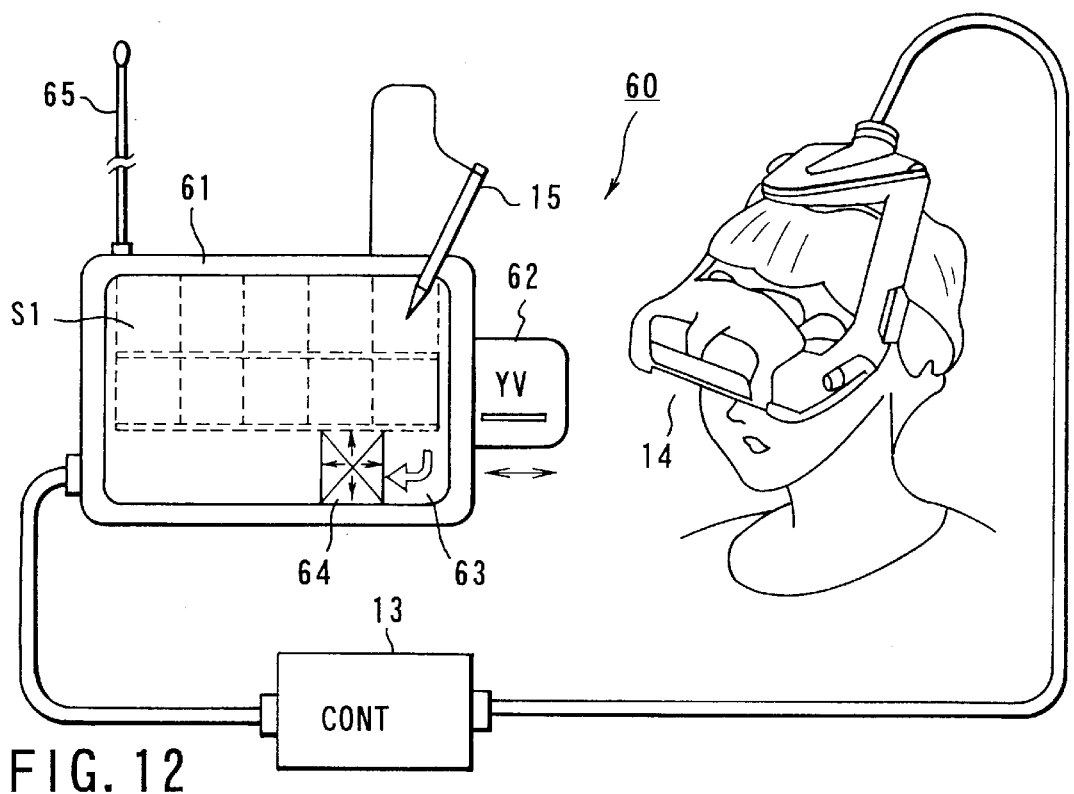
FIG. 12 is a diagram showing a schematic configuration of an information processing apparatus according to a sixth embodiment of the present invention.

FIG. 12 is a diagram showing a configuration of an information processing apparatus 60 according to a sixth embodiment of the invention. Where the configuration of the present embodiment is identical to that of the first embodiment, like reference numbers will be used and description will be omitted.

The present embodiment includes an application for a television system which receives broadcast waves from a plurality of channels and broadcasting them selectively.

As shown in FIG. 12, an IC card 62 for a television tuner for receiving and broadcasting television pictures can be set in a portable terminal device 61 at appropriate time. An antenna 65 for receiving television broadcast waves is attached to the portable terminal device 61 to allow reception of television broadcast waves.

Figure 13A:
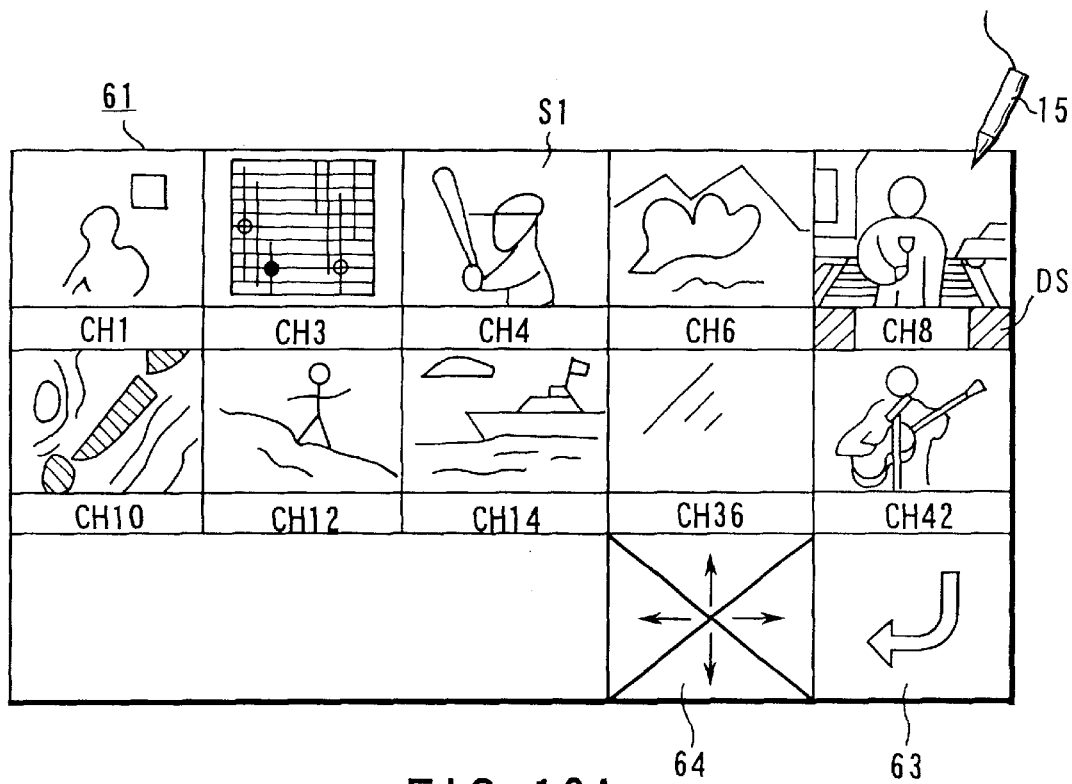
FIGS. 13A and 13B are diagrams showing a use and the like of an information processing apparatus according to the sixth embodiment of the present invention.
Figure 13B:
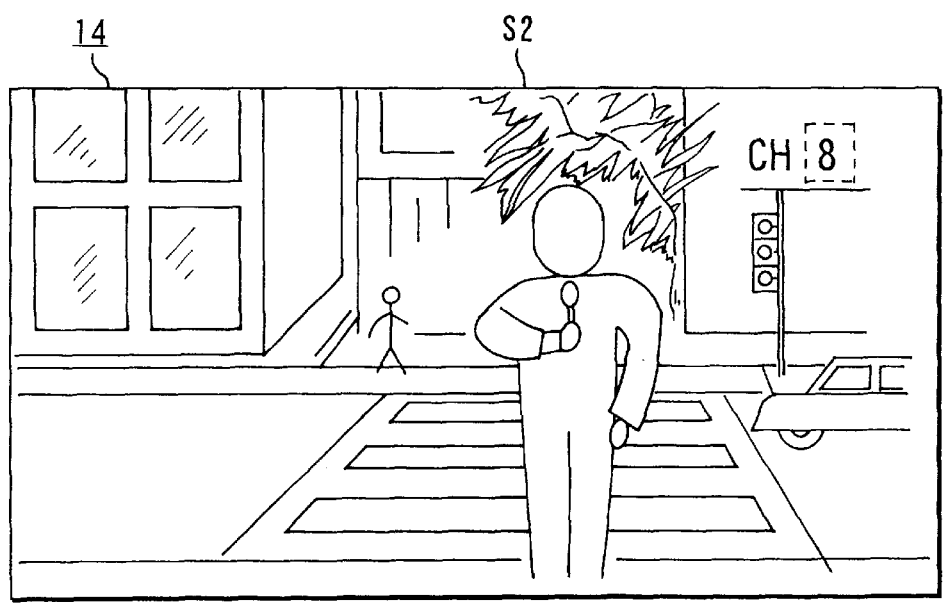

When the IC card 62 is set in the portable terminal device 61 and activated, television pictures broadcasted over a plurality of different channels can be simultaneously observed in the form of a menu on a display screen S1 of the portable terminal device 61 as shown in FIG. 13A. If the channel No. for a desired picture, e.g., CH8, is selected, a change occurs in the selection display portion DS showing the channel number to indicate that the selection was made. At the same time, the television picture over the selected channel is displayed on a display screen S2 of an HMD 14 as shown in FIG. 13B. At this time, the channel No. is displayed, for example, at the upper right corner of the display screen S2 as shown in FIG. 13B.

When it is desired to watch a picture over another channel on the HMD 14, it is only required to select it from the menu screen displayed on the display screen Sl of the portable terminal device 61.

The channels displayed on the menu screen can be changed to other channels through the following steps. One of the channel selection display portions DS, e.g., CH1 is double-clicked with a pointing device 15. Then, a display in the form of a pull-down menu appears to show a list of channels which are not currently displayed and over which television broadcast waves can be received. Then, a desired channel may be selected to display pictures over the channel.

To clear the picture displayed on the display screen S2 of the HMD 14, an input fixing key 63 on the portable terminal device 61 is operated. This clears the picture displayed on the display screen S2 of the HMD 14, and the selection display portion DS of the portable terminal device 61 enters an unselected state.

It is therefore possible to watch programs over various channels on the portable terminal device 61 while enjoying the most favorite program on the HMD 14, e.g., to watch a news program at intervals of a sports program or to watch a program over a different channel in a period for a commercial message in a program of a commercial broadcast. Further, television programs can be enjoyed in a manner in which a user can switch channel with an overview of all programs. Therefore, a user can search a desired program or a desired scene while watching another television program.

(Seventh Embodiment)

Figure 14:
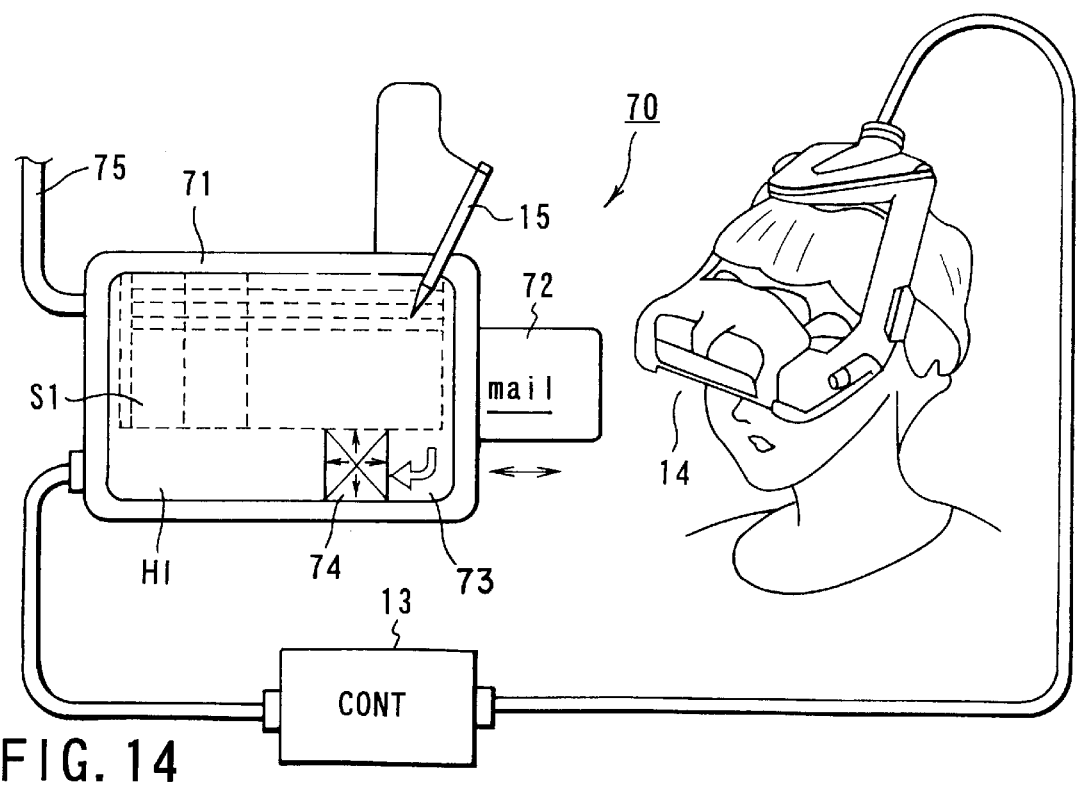
FIG. 14 is a diagram showing a schematic. configuration of an information processing apparatus according to a seventh embodiment of the present invention.

FIG. 14 is a diagram showing a configuration of an information processing apparatus 70 according to a seventh embodiment of the invention. Where the configuration of the present embodiment is identical to that of the first embodiment, like reference numbers will be used and description will be omitted.

The present embodiment represents an application in which details of mail from among a list of electric mail are displayed on an HMD 14.

As shown in FIG. 14, an electronic mail IC card 72 can be set in a portable terminal device 71 at appropriate time. The portable terminal device 71 can be connected to a mail server (a computer, a telephone set or the like) through a mail communication cable 75.

After making a predetermined setting, an application is activated to display a list of electronic mail as shown in FIG.

15A on a display screen S1 of the portable terminal device 71. The description will now proceed with reference to an example of the reception of mail.

As shown in FIG. 1SA, the display screen S1 of the portable terminal device 71 shows a list of mail including the dates and time of reception, the mail addresses of the senders and the titles. This list can be scrolled with a cursor key 74. A double-click with the pointing device 15 on an item of mail to be read, e.g., the mail No. 1 causes the contents of the mail as shown in FIG. 15B to be displayed on a display screen S2 of an HMD 14. At this time, a "selection indicator" is put on the selected line on the mail list on the display screen S1 of the portable terminal device 71 to indicate it is displayed on the HMD 14.

When another item of mail is to be read, it is only required to double-click with the pointing device 15 the line corresponding to the mail on the portable terminal device 71. An input fixing key 73 is operated to stop the display on the HMD 14. This erase the contents of the mail displayed on the display screen S2.

When it is desired to read the mail represented by the line where a cursor 76 is located as shown in FIG. 16A, the input fixing key 73 is operated in this sate. Then, the mail represented by the line where the cursor 76 is located is displayed on the display screen S2 of the HMD 14. Referring to the deletion of mail, a handwritten input of a character "X" to a handwriting input portion HI of the portable terminal device 71 as shown. in FIG. 16B will delete the line for the mail after an indication telling that the line for the mail where the cursor 76 is currently located is deleted.

It is thus possible to look at the contents of an item of mail on the display screen S2 of the HMD 14 while looking at the mail list on the display screen S1 of the portable terminal device 71. Thus, an desired item of mail can be easily selected and read. In the case of mail transmission, an item of mail to be edited is displayed on the display screen S2 of the HMD 14 and it can be transmitted with any sentence(s) added thereto as needed by inputting handwriting characters and the like.

The types of the titles of information/data applicable to the first through seventh embodiments described above can be summarized as follows.

(1) Information/data constituted only by characters (first, second and third embodiments)
(2) Information/data constituted only by graphic patterns indicating the contents of a title (first, second and third embodiments)
(3) A combination of the above (1) and (2) (first, second and third embodiments)
(4) Information/data which obtained by contracting the contents of a title (fourth and sixth embodiments)
(5) Information/data obtained by contracting a layout showing the contents of one title which is a combination of a plurality of data (fourth embodiment)
(6) Information/data representing a part of a graphic pattern as a whole to be displayed (fifth embodiment)
(7) Information/data collectively formed by a party to transmit or receive, time, a title and the like (seventh embodiment)

(First Example of Apparatus Configuration)

Examples of specific apparatus configurations to be used for the information processing apparatuses according to the first through seventh embodiments will now be described with reference to FIGS. 17 through 21.

First, an example of a first apparatus configuration will be described with reference to FIG. 17.

Figure 17:
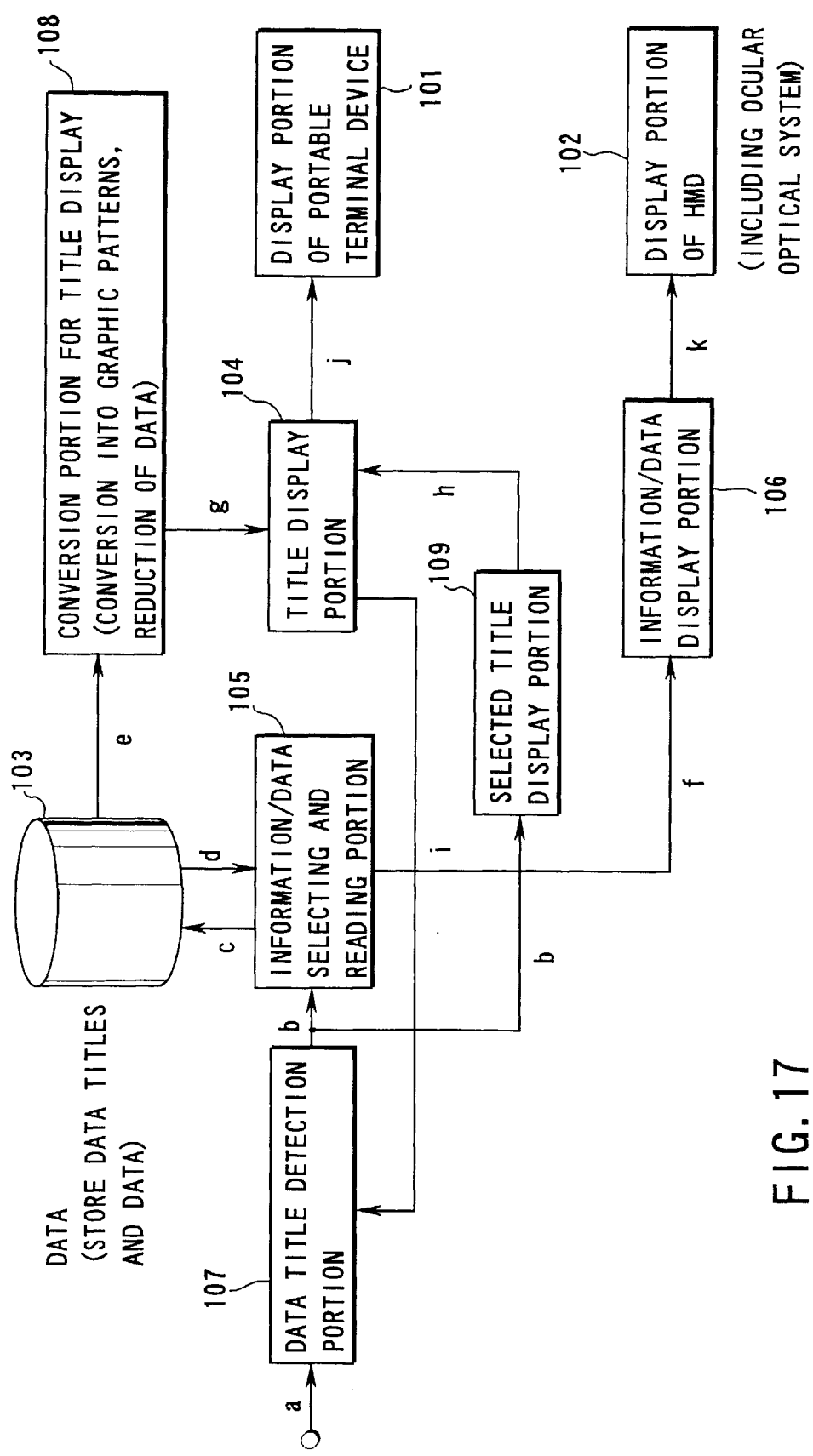
FIG. 17 is a block diagram showing a first apparatus configuration.

FIG. 17 is a block diagram showing a configuration of a basic electrical system used in the information processing apparatuses according to the first through fourth embodiments.

Reference number 101 represents the display portion of the portable terminal device 11 as a first image display portion.

102 represents the display portion of the HMD 14 as a second image display portion. The image display portion 102 includes an ocular optical system for guiding an image displayed by the second image display portion to the eyeballs of an observer with a substantial magnification from the display area of the first image display portion.

103 represents a memory portion for storing plural types of information/data each having a specific title.

104 represents a title display portion for sending the titles of the plural types of information/data stored in the memory portion 103 collectively to the display portion 101 of the portable terminal device 11 as the first image display portion to display them thereon.

105 represents an information/data selecting and reading portion for selecting and reading arbitrary item of information/data from among the plural types of information/data stored in the memory portion 103 based on an external command.

106 represents an information/data display portion for sending the information/data read by the information/data selecting and reading portion 105 to the display portion 102 of the HMD 14 as the second image display portion to display it thereon.

107 represents a data title detection portion; 108 represents a conversion portion for title display (for performing conversion into graphic patterns, contraction of data and the like); and 109 represents a selected title display portion.

In the information processing apparatus having such a configuration, when terminal screen position information and read control information "a" selected using the pointing device 15 of the portable terminal device 11 is sent to the data title detection portion 107, the data title detection portion 107 detects titles of data from the information "a" and outputs title information "b" as a result of the detection.

Upon receipt of the title information "b", the information/data selecting and reading portion 105 outputs information "c" for retrieving data using the title information as a key. Upon receipt of the information "c" for retrieving data, the memory portion 103 outputs retrieved data "d" and title information "e" associated with each item of data.

Upon receipt of the retrieved data "d", the information/data selecting and reading portion 105 outputs read data f. Upon receipt of the title information "e" associated with each item of data, the conversion portion 108 for title display (performing conversion into graphic patterns, contraction of data and the like) outputs title information "g" which has been converted for display. Upon receipt of the title information "g", the selected title display portion 109 outputs control information "h" for changing the display of a title. Upon receipt of the title information "y" and the control information "h", the title display portion 104 outputs information "i" on the position of each title on the display screen S1 of the portable terminal device. Then, the title display portion 104 outputs title information "j" which can be collectively displayed to the display portion 101 of the portable terminal device 11. Upon receipt of the read data "f", the data display portion 106 outputs data/information k which can be displayed to the display portion 102 of the HMD 14.

With such a configuration, title information is displayed on the display screen S1 of the portable terminal device 11 as shown in FIG. 1A, and data/information is displayed on the display screen S2 of the HMD 14 as shown in FIG. 1B.
(Second Example of Apparatus Configuration)

An Example of a second apparatus configuration to be used for the information processing apparatuses according to the first through fourth embodiments will now be described with reference to FIG. 18.

The second apparatus configuration is a configuration obtained by adding a function of activating an application at the time of data reading and a function of writing data to the basic configuration shown in FIG. 17.

Figure 18:
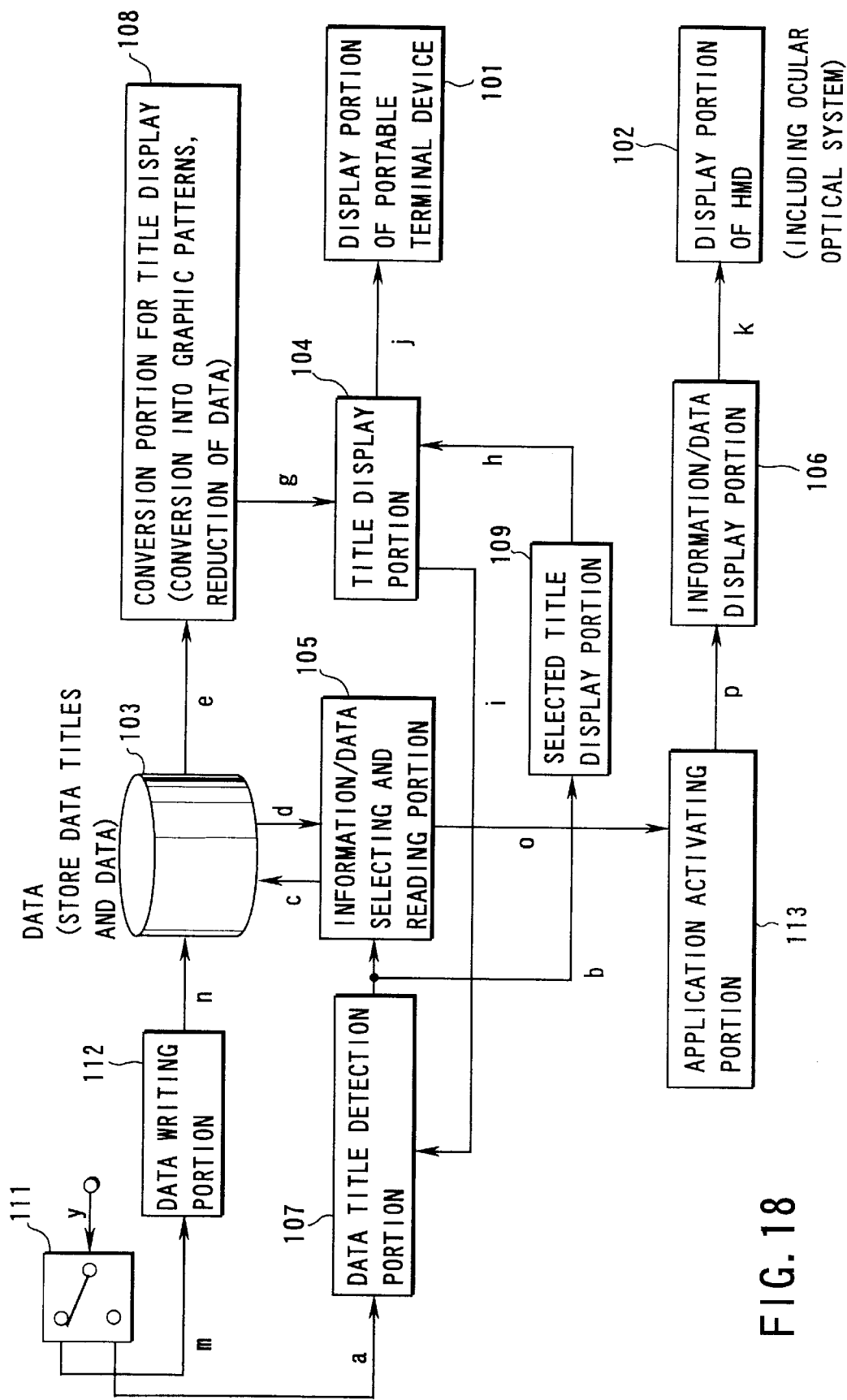
FIG. 18 is a block diagram showing a second apparatus configuration.

Specifically, in FIG. 18, 111 represents a data read/write select switch; 112 represents a data writing portion; and 113 represents an application activating portion. The configuration is otherwise the same as that in FIG. 17.

In such a configuration, when switch driving information and data "y" for reading/writing, which are selected by the pointing device 15, are received, the data y becomes data to be written and write control information "m" or terminal screen position information and read control information "a" depending on the state of the data read/write select switch 111. The information "a" input to the data title detection portion 107 an in FIG. 17 while the data to be written and write control information "m" is input to the data writing portion 112.

The data writing portion 112 receives the data and write control information "m" and outputs write data "n". The memory portion 103 receives the write data "n" and stores it.

The data selecting and reading portion 105 outputs data read from the memory portion 103 and information "o" indicating the type of the application. The application activating portion 113 outputs data "p" which has become recognizable as a result of the activation thereof to the data display portion 106 to display the same on the HMD 14.

The operation is otherwise the same as that in FIG. 17. This configuration becomes applicable to the sixth and seventh embodiments if the "data selecting and reading portion" and "data writing portion" in FIG. 18 are changed to read "data receiving portion" and "data transmitting portion", respectively. (Third example of apparatus configuration)

Figure 19:
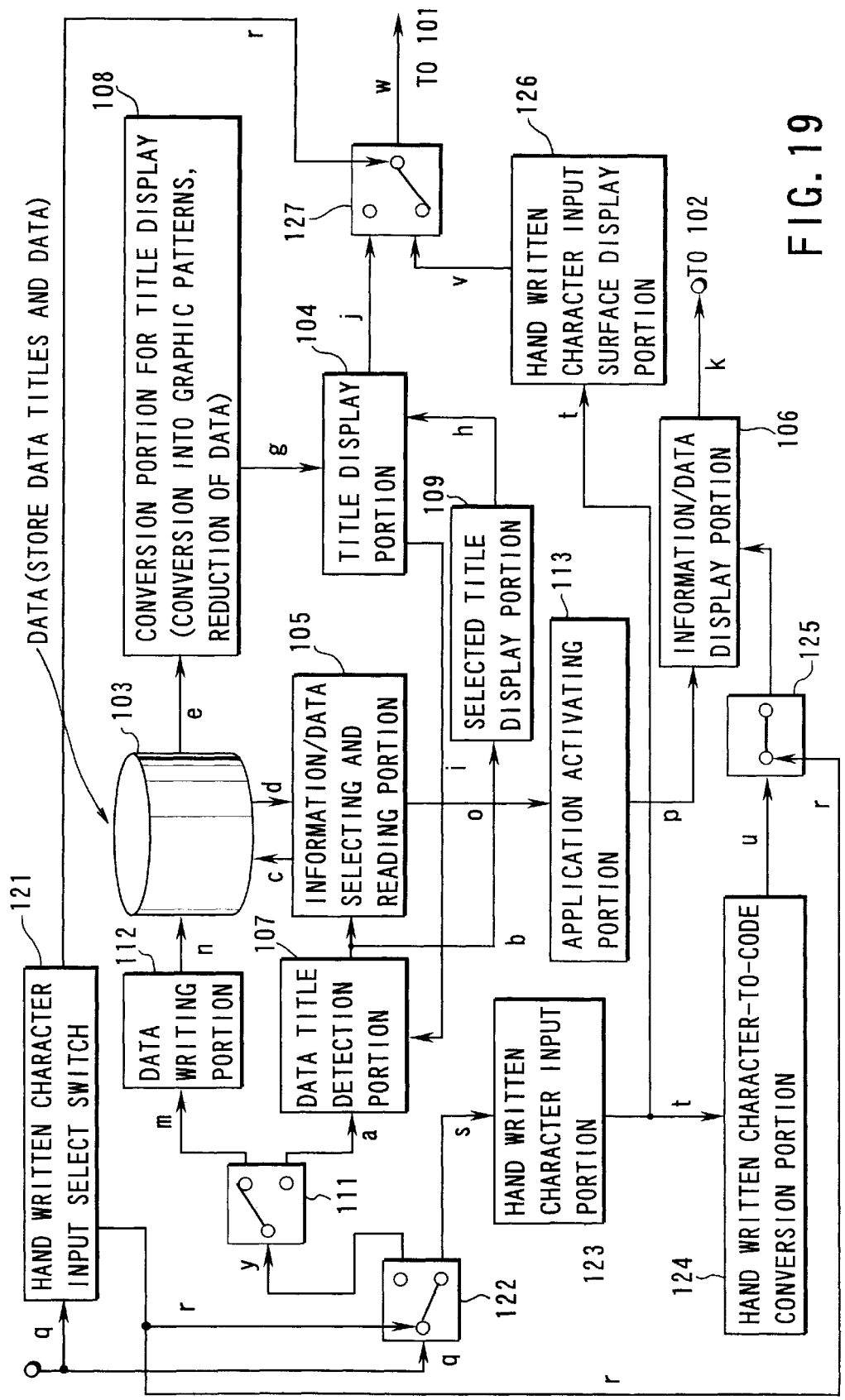
FIG. 19 is a block diagram showing a third apparatus configuration.

FIG. 19 is a diagram showing an example of a third apparatus configuration which can be applied to the information processing apparatuses according to the first through fourth embodiments. The configuration shown in FIG. 19 is obtained by adding a function of allowing handwriting character input on the display. screen of the portable terminal device 11 to the configuration shown in FIG. 18.

In FIG. 19, 121 represents a handwriting character input select switch driving portion; 122 represents a first handwriting character input select switch; 123 represents a handwriting character input portion; 124 represents a handwritten character-to-code conversion portion; 125 represents a second handwriting character input select switch; 126 represents a handwriting character input surface display portion; and 127 represents a third handwriting character input select switch.

Thus, when handwritten character input control information and data for reading/data for writing "q" is received from the pointing device 15, the handwriting character input select switch driving portion 121 outputs switch driving information "r".

The first handwriting character input select switch 122 is switched according to the switch driving information "r" to separately output switch driving information and data "y" for read/write and control information "s" for allowing handwritten character input. The switch driving information and the data "y" for reading/writing is sent to the data read/write select switch 111 as in FIG. 18, and the control information "s" is sent to the handwriting character input portion 123. Upon receipt of the control information "s", the handwriting character input portion 123 outputs handwritten character information "t". Upon receipt of the handwritten character information "t", the handwritten character-to-code conversion portion 124 outputs handwritten character information "u" which has been converted into codes. The second handwriting character input select switch 125 allows the handwritten character information "u" which has been converted into codes to pass therethrough to provide it to the above-described data display portion 106 only when the switch driving information "r" is available to it.

Upon receipt of the handwritten character information "t", the handwriting character input surface display portion 126 outputs information "v" on a handwriting character input surface which becomes available for display. The third handwriting character input select switch 127 is switched according to the switch driving information "r" to selectively extract the information "j" on the titles which can be collectively displayed or the information "v" on the handwriting character input surface which becomes available for display and outputs title information/ handwritten character information "w" to the display portion 101 of the portable terminal device 11.

The configuration is otherwise the same as that in FIG. 18. This configuration becomes applicable to the sixth and seventh embodiments if the "data selecting and reading portion" and "data writing portion" in FIG. 19 are changed to read "data receiving portion" and "data transmitting portion", respectively.
(Fourth Example of Apparatus Configuration)

Figure 20:
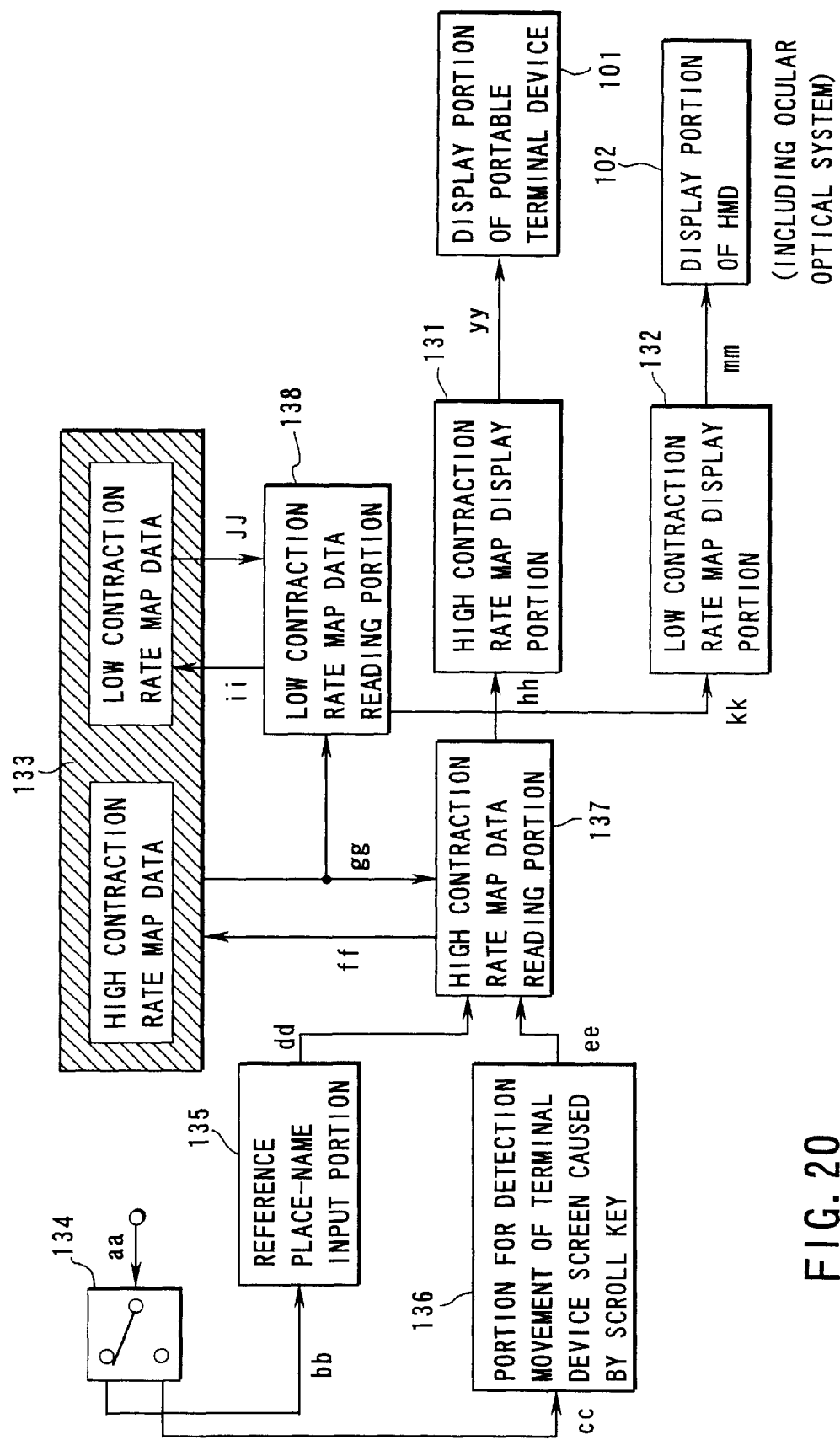
FIG. 20 is a block diagram showing a fourth apparatus configuration.

FIG. 20 shows an example of a fourth apparatus configuration which can be applied to the information processing apparatus according to the fifth embodiment. In FIG. 20, 131 represents a map display portion for displaying images at a high contraction rate, and 132 represents a map display portion for displaying images at a low contraction rate. 133 represents a memory device for storing map data at a high contraction rate and map data at a low contraction rate. 134 represents a data reading method select switch; 135 represents a reference place name input portion; 136 represents a portion for detecting the movement of the terminal screen caused by the scroll key; 137 represents a high contraction rate map data reading portion; and 138 represents a low contraction rate map data reading portion.

When map data read control information and reading portion switching information "aa" ("aa" means two informations) selected using the pointing device 15 of the portable terminal device 51 is received, the information is split into control information "bb" for allowing reading based on a reference place name and control information "cc" for allowing reading based on the movement of the screen scroll key 54 depending on the state of the data reading method select switch 134. Upon receipt of the control information "bb", the reference place name input portion 135 outputs reference place name data "dd". Upon receipt of the control information "cc", the portion 136 for detecting the movement of the terminal screen caused by the scroll key outputs data "ee" of the movement of the terminal screen caused by the scroll key. Upon receipt of the reference place name data "dd" and the terminal screen movement data "ee", the high contraction map data reading portion 137 outputs information "ff" for retrieving read map data.

Upon receipt of the read map data retrieval information "ff", the memory device 133 first outputs retrieved high contraction rate map data and information "gg" ("gg" means two informations) on the central position of the same. Upon receipt of the high contraction rate map data and the central position information "gg", the high contraction rate map data reading portion 137 outputs read high contraction rate map data "hh" (for which a range for display has been determined). Upon receipt of the high contraction rate map data and the central position information "gg", the low contraction rate map data reading portion 138 outputs information "ii" for retrieving the low contraction rate map data to be read utilizing the central position information. Upon receipt of the low contraction rate map data retrieval information "ii", the memory device 133 outputs retrieved low contraction rate map data "JJ". Upon receipt of the retrieved low contraction rate map data "JJ", the low contraction rate map data reading portion 138 outputs read low contraction rate map data "kk" (for which a range for display has been determined).

Upon receipt of the read high contraction rate map data "hh" (for which a range for display has been determined), the high contraction rate map display portion 131 outputs high contraction rate map data "yy" which has become available for display to the display portion 101 of the portable terminal device 51.

Upon receipt of the read low contraction rate map data "kk" (for which a range for display has been determined), the low contraction rate map display portion 132 outputs low contraction rate map data "mm" which has become available for display to the display portion 102 of the HMD 14.

(Fifth Example of Apparatus Configuration)

Figure 21:
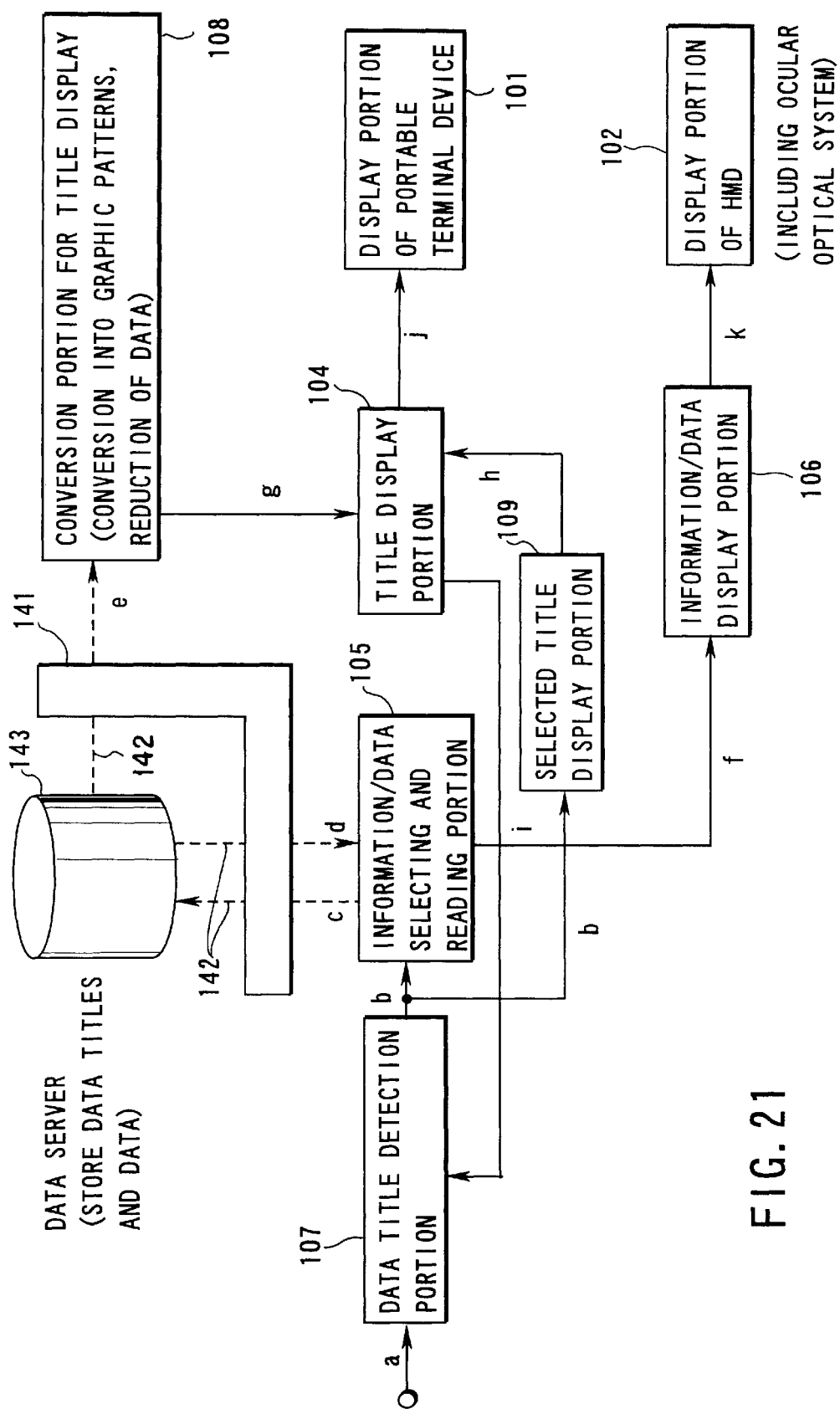
FIG. 21 is a block diagram showing a fifth apparatus configuration.

FIG. 21 is a block diagram showing an example of a fifth apparatus configuration which can be applied to the information processing apparatuses according to the sixth and seventh embodiments. In this example of a fifth apparatus configuration, an information transmission means utilizing data communication is added to the basic configuration shown in FIG. 17.

Specifically, 141 represents a receiving portion; 142 represents a transmission path; and 143 represents a data server. The function of each part shown in FIG. 21 is the same as in FIG. 17 and will not be described here except the addition of the information transmission means utilizing data communication described above.

The present invention is not limited to the above-described embodiments, and various modifications are obviously possible within a scope in which the principle of the invention is not affected.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   an information/data memory which stores information/data in association with predetermined titles;
   an external display which displays a screen for selecting a desired title from among said predetermined titles;
   an information/data retrieval device which accepts the desired title selected via the screen displayed on said external device, and which retrieves information/data associated with the selected title from said information/data memory; and
   a head-mounted information/data display which projects detailed information/data corresponding to the information/data retrieved by said information/data retrieval device on a display screen thereof;
   wherein both said head-mounted information/data display and said external display are capable of achieving display in a same field of view of a single user.

2. The information processing apparatus according to claim 1, wherein said head-mounted information/data display includes an ocular optical system for guiding said retrieved information/data to the user's eyeballs with a substantial magnification from at least a display area of said external display.

3. The information processing apparatus according to claim 2, wherein said ocular optical system includes an external observation optical system for allowing observation of the screen for title selection displayed on said external display.

4. The information processing apparatus according to claim 3, wherein said ocular optical system includes an image switching optical system for selectively displaying either or both of the screen for title selection displayed on said external display and said detailed information/data displayed by said head-mounted information/data display.

5. The information processing apparatus according to claim 3, wherein a distance of distinct vision of said head-mounted information/data display is set in accordance with a distance to said external display.

6. The information processing apparatus according to claim 1, wherein said information/data display is adapted to enable the user thereof to observe an external environment.

7. The information processing apparatus according to claim 1, wherein said information/data memory, said external display and said information/data retrieval device are integrally contained in a case which can be carried by hand.

8. The information processing apparatus according to claim 1, wherein said external display displays icons which correspond to said predetermined titles and which represent contents of the information/data associated with said predetermined titles.

9. The information processing apparatus according to claim 1, wherein said external display includes an image data contraction/display device which provides a contracted display of each piece of information/data associated with said desired title.

10. The information processing apparatus according to claim 1, further comprising a title display modification device for displaying a respective one of said predetermined titles corresponding to the detailed information/data displayed on said head-mounted information/data display such that the respective one of said predetermined titles can be distinguished from other ones of said predetermined titles on the screen for title selection displayed on said external display.

11. The information processing apparatus according to claim 1, further comprising:
   a handwriting character input device provided in said external display;
   a handwritten-character display device which displays handwritten characters input from said handwriting character input device on the external display, after the information/data retrieval device has retrieved the information/data associated with the selected title from said information/data memory;
   a character code conversion device which converts the handwritten characters input from said handwriting character input device into character codes; and a character display device which displays on said head-mounted information/data display the character codes produced by the character code conversion device.

12. The information processing apparatus according to claim 1, wherein said information/data memory comprises a replaceable memory.

13. The information processing apparatus according to claim 1, further comprising an information/data writing device which writes plural types of information/data which have been created or modified by the user into said information/data memory.

14. The information processing apparatus according to claim 1, wherein said external display comprises a portable display.

* * * * *